US012563558B2

(12) United States Patent
Li et al.

(10) Patent No.: US 12,563,558 B2
(45) Date of Patent: Feb. 24, 2026

(54) INFORMATION TRANSMISSION METHOD AND APPARATUS

(71) Applicant: HUAWEI TECHNOLOGIES CO., LTD., Shenzhen (CN)

(72) Inventors: Ruijie Li, Beijing (CN); Lei Guan, Beijing (CN); Shengyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 18/335,742

(22) Filed: Jun. 15, 2023

(65) Prior Publication Data

US 2023/0328739 A1 Oct. 12, 2023

Related U.S. Application Data

(63) Continuation of application No. PCT/CN2020/137760, filed on Dec. 18, 2020.

(51) Int. Cl.
*H04W 72/21* (2023.01)
*H04L 1/00* (2006.01)

(52) U.S. Cl.
CPC ........... *H04W 72/21* (2023.01); *H04L 1/0003* (2013.01); *H04L 1/0009* (2013.01)

(58) Field of Classification Search
CPC ..... H04L 1/0003; H04L 1/0009; H04W 72/21
See application file for complete search history.

(56) References Cited

U.S. PATENT DOCUMENTS

| | | | |
|---|---|---|---|
| 2011/0310855 A1 | 12/2011 | Yin et al. | |
| 2014/0177572 A1* | 6/2014 | Papasakellariou .... | H04W 72/21 370/329 |
| 2020/0274637 A1* | 8/2020 | Li .......................... | H04L 5/0053 |
| 2021/0100024 A1* | 4/2021 | Bang ..................... | H04L 5/0051 |
| 2022/0369328 A1* | 11/2022 | Takahashi ........... | H04W 72/569 |
| 2023/0043456 A1* | 2/2023 | Li .......................... | H04L 5/0035 |

FOREIGN PATENT DOCUMENTS

| | | |
|---|---|---|
| CN | 102122979 A | 7/2011 |
| WO | 2020001484 A1 | 1/2020 |

OTHER PUBLICATIONS

International Search Report issued in corresponding International Application No. PCT/CN2020/137760, dated Sep. 18, 2021, pp. 1-9.

* cited by examiner

*Primary Examiner* — Brian P Cox
(74) *Attorney, Agent, or Firm* — HAUPTMAN HAM, LLP

(57) ABSTRACT

Embodiments of this application disclose an information transmission method and an apparatus therefor. The method includes: A terminal device sends uplink control information UCI to a network device through an uplink data channel. The uplink data channel carries N data blocks. The N data blocks include a first data block and a second data block. N is a positive integer greater than or equal to 2. The first data block is modulated based on a first modulation and coding scheme MCS, and the second data block is modulated based on a second MCS. Implementation of embodiments of this application helps ensure reliability of downlink data transmission.

20 Claims, 8 Drawing Sheets

Time-frequency resource of UCI

Time-frequency resource of uplink data channel

Frequency domain

One subcarrier

One OFDM symbol

Time domain

Time-frequency resource of UCI

Time-frequency resource of uplink data channel

Frequency domain

One subcarrier

One OFDM symbol          Time domain

▨ Time-frequency resource of UCI

▨ Time-frequency resource of uplink data channel

101

102

Send UCI through an uplink data channel

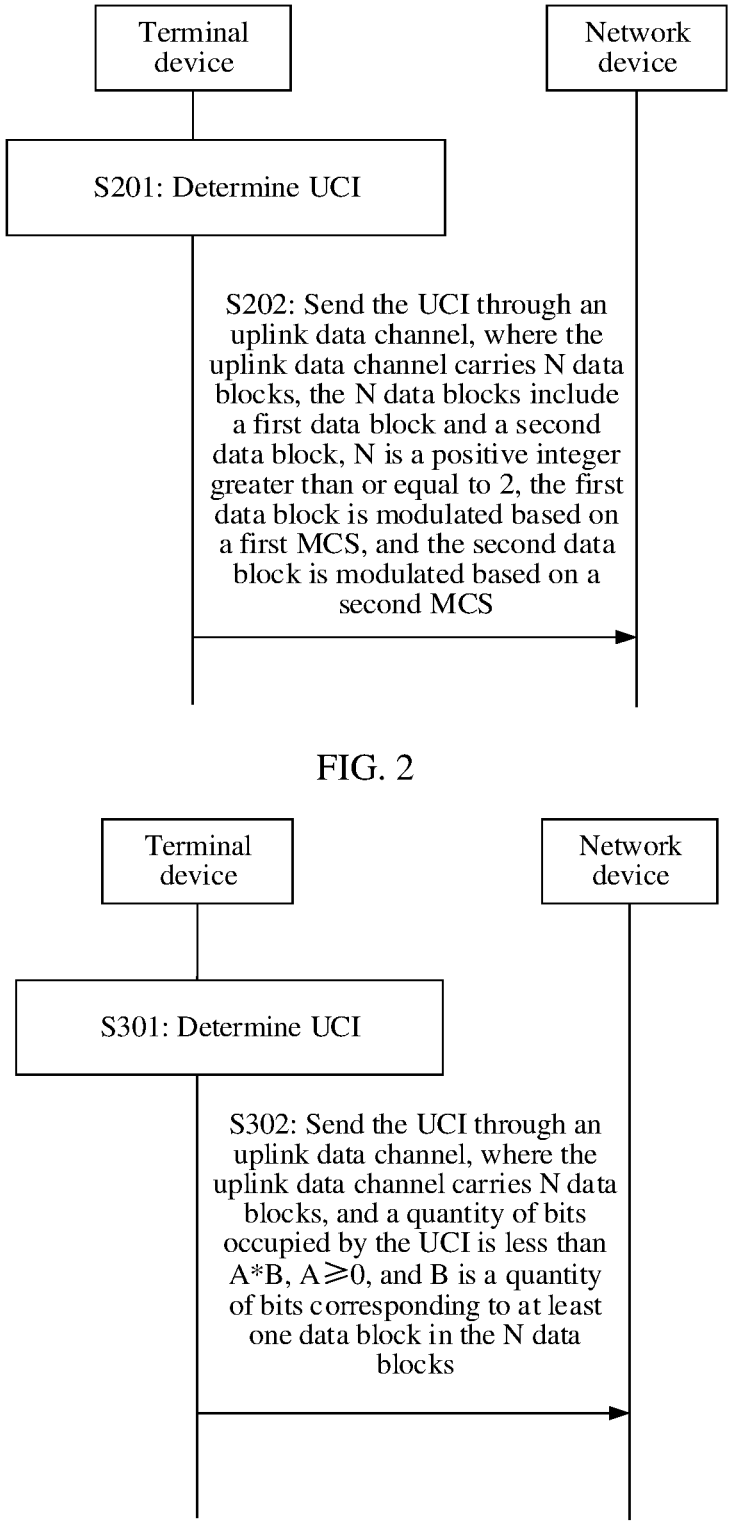

Terminal device

Network device

S201: Determine UCI

S202: Send the UCI through an uplink data channel, where the uplink data channel carries N data blocks, the N data blocks include a first data block and a second data block, N is a positive integer greater than or equal to 2, the first data block is modulated based on a first MCS, and the second data block is modulated based on a second MCS

FIG. 2

Terminal device

Network device

S301: Determine UCI

S302: Send the UCI through an uplink data channel, where the uplink data channel carries N data blocks, and a quantity of bits occupied by the UCI is less than A*B, A≥0, and B is a quantity of bits corresponding to at least one data block in the N data blocks

FIG. 3

INFORMATION TRANSMISSION METHOD AND APPARATUS

CROSS-REFERENCE TO RELATED APPLICATIONS

This application is a continuation of International Patent Application No. PCT/CN2020/137760, filed on Dec. 18, 2020, the disclosure of which is hereby incorporated by reference in its entirety.

TECHNICAL FIELD

This application relates to the field of communication technologies, and in particular, to an information transmission method and an apparatus therefor.

BACKGROUND

When a time domain resource of an uplink control channel overlaps a time domain resource of an uplink data channel, a terminal device sends the uplink control channel or the uplink data channel, that is, sends only one of the channels. If the terminal device sends the uplink data channel, information, for example, uplink control information (uplink control information, UCI), carried on the uplink control channel is discarded.

However, discarding the UCI affects reliability of downlink data transmission.

SUMMARY

Embodiments of this application provide an information transmission method and an apparatus therefor, to help ensure reliability of downlink data transmission.

According to a first aspect, this application provides an information transmission method. The method may be performed by a terminal device or may be performed by a chip used in a terminal device. The method includes: A terminal device determines uplink control information UCI, and sends the UCI to a network device through an uplink data channel. The uplink data channel carries N data blocks. The N data blocks include a first data block and a second data block. N is a positive integer greater than or equal to 2. The first data block is modulated based on a first modulation and coding scheme MCS. The second data block is modulated based on a second MCS.

In this technical solution, on the one hand, the UCI is transmitted through the uplink data channel, which helps ensure reliability of downlink data transmission. On the other hand, compared with the conventional art in which service data of the terminal device is transmitted through one data block, use of the solution of transmitting the service data of the terminal device through the N data blocks helps ensure quality of service of the terminal device.

In a possible implementation, a time-frequency resource of the uplink data channel overlaps a time-frequency resource of the UCI.

In a possible implementation, time-frequency resources occupied by any two data blocks in the N data blocks partially overlap each other or do not overlap each other at all.

In this technical solution, time-frequency resources occupied by any two data blocks in the N data blocks do not overlap each other at all, so that all data blocks in the N data blocks can be distinguished in time domain or frequency domain. Compared with a manner of distinguishing data blocks based on a space resource (for example, a layer), this technical solution is more flexible.

In a possible implementation, the UCI does not include channel state information CSI.

In a possible implementation, a quantity of bits occupied by the UCI is less than $A*B$, $A \geq 0$, and B is a quantity of bits corresponding to at least one data block in the N data blocks.

In this technical solution, that the quantity of bits occupied by the UCI is less than $A*B$ indicates that the UCI occupies fewer bits. Because when the UCI is transmitted on the uplink data channel, a time-frequency resource of the uplink data channel needs to be occupied, time-frequency resources that are on the uplink data channel and that are originally for transmitting data blocks may be reduced. The quantity of bits occupied by the UCI is less than $A*B$, so that a quantity of bits of the UCI allowed to be transmitted through the uplink data channel can be limited, which helps prevent the UCI from occupying all resources of the uplink data channel and causing a failure of data block transmission.

In a possible implementation, B is specifically a quantity of bits corresponding to $m_1$ data blocks, $1 \leq m_1 \leq N$, $m_1$ is a positive integer, and the $m_1$ data blocks belong to the N data blocks. The $m_1$ data blocks are determined based on a quantity of bits corresponding to at least one data block in the N data blocks; or the $m_1$ data blocks are determined based on a priority of at least one data block in the N data blocks.

In a possible implementation, spectral efficiency of the UCI is higher than spectral efficiency of an $n_1^{th}$ data block, $1 \leq n_1 \leq N$, and $n_1$ is a positive integer.

In this technical solution, that spectral efficiency of the UCI is higher than spectral efficiency of an $n_1^{th}$ data block indicates that a reliability requirement of the UCI is lower than a reliability requirement of the $n_1^{th}$ data block. In this way, when the UCI is transmitted through the uplink data channel, reliability of the UCI can be better ensured.

In a possible implementation, the $n_1^{th}$ data block is determined based on spectral efficiency of at least one data block in the N data blocks; or the $n_1^{th}$ data block is determined based on an MCS corresponding to at least one data block in the N data blocks; or the $n_1^{th}$ data block is determined based on a priority of at least one data block in the N data blocks and a priority of the UCI; or the $n_1$ data blocks are determined based on a quantity of bits corresponding to at least one data block in the N data blocks.

In a possible implementation, a priority of the UCI is the same as a priority of the uplink data channel; or a priority of the UCI is the same as a priority of at least one data block in the N data blocks.

In a possible implementation, the method further includes: The terminal device determines a smaller value between a value P and a value Q as a quantity of resource elements that are on the uplink data channel and that are for transmitting the UCI. The value P is a quantity of resource elements occupied by the UCI, and the value Q is an upper limit of the quantity of resource elements that are on the uplink data channel and that are for transmitting the UC. P and Q are respectively integers greater than or equal to 1.

In a possible implementation, the value P is determined based on a quantity of bits corresponding to at least one data block in the N data blocks.

In a possible implementation, the value P is determined based on a quantity of bits corresponding to $m_2$ data blocks in the N data blocks, $1 \leq m_2 \leq N$, and $m_2$ is a positive integer. The $m_2$ data blocks are determined based on a priority of at least one data block in the N data blocks and a priority of the UCI; or the $m_2$ data blocks are determined based on a quantity of bits corresponding to at least one data block in the N data blocks.

In a possible implementation, the value P is determined based on a modulation scheme and/or a code rate corresponding to an $n_2{}^{th}$ data block, $1 \leq n_2 \leq N$, and $n_2$ is a positive integer.

In a possible implementation, the $n_2{}^{th}$ data block is determined based on a priority of at least one data block in the N data blocks and a priority of the UCI; or the $n_2{}^{th}$ data block is determined based on spectral efficiency of at least one data block in the N data blocks; or the $n_2$th data block is determined based on an MCS corresponding to at least one data block in the N data blocks.

In a possible implementation, the value Q is determined based on a quantity of resource elements occupied by an $n_3{}^{th}$ data block and/or a first parameter corresponding to the $n_3{}^{th}$ data block, $1 \leq n_3 \leq N$, and $n_3$ is a positive integer. The first parameter is for determining the value Q, to cause the value Q to be less than a sum of quantities of resource elements occupied by the N data blocks.

In a possible implementation, the $n_3{}^{th}$ data block is determined based on a priority of at least one data block in the N data blocks and a priority of the UCI; or the $n_3{}^{th}$ data block is determined based on a quantity of bits corresponding to at least one data block in the N data blocks; or the $n_3{}^{th}$ data block is determined based on spectral efficiency of at least one data block in the N data blocks; or the $n_3{}^{th}$ data block is determined based on an MCS corresponding to at least one data block in the N data blocks.

In a possible implementation, the first parameter corresponding to the $n_3{}^{th}$ data block is determined by the network device based on a reliability-related parameter corresponding to the $n_3{}^{th}$ data block; or the first parameter is determined by the network device based on a priority of the $n_3{}^{th}$ data block.

In a possible implementation, a time-frequency resource occupied by the UCI is included in a time-frequency resource corresponding to $m_3$ data blocks in the N data blocks, $1 \leq m_3 \leq N$, and $m_3$ is a positive integer. The $m_3$ data blocks are determined based on a priority of at least one data block in the N data blocks; or the $m_3$ data blocks are determined based on a priority of at least one data block in the N data blocks and a priority of the UCI; or the $m_3$ data blocks are determined based on a reliability-related parameter corresponding to at least one data block in the N data blocks; or the $m_3$ data blocks are determined based on spectral efficiency of at least one data block in the N data blocks; or the $m_3$ data blocks are determined based on an MCS corresponding to at least one in the N data blocks; or the $m_3$ data blocks are determined based on a latency-related parameter corresponding to at least one data block in the N data blocks.

In this technical solution, the $m_3$ data blocks may include a data block with a low priority in the N data blocks. Through this method, the UCI can be prevented from affecting transmission performance of a data block with a higher priority. Alternatively, the $m_3$ data blocks may include a data block with a same priority as the UCI in the N data blocks. Through this method, the UCI can be prevented from affecting transmission performance of a data block with a higher priority than the UCI. Alternatively, the $m_3$ data blocks may include a data block whose corresponding reliability-related parameter has a minimum value in the N data blocks. A reliability-related parameter corresponding to a data block may indicate a reliability requirement of the data block. A smaller value of the reliability-related parameter corresponding to the data block may indicate a lower reliability requirement of the data block. In this manner, the UCI can be prevented from affecting transmission performance of a data block with a higher reliability requirement. Alternatively, the $m_3$ data blocks may include a data block with highest spectral efficiency in the N data blocks. A data block with higher spectral efficiency has a lower reliability requirement. In this manner, the UCI can be prevented from affecting transmission performance of a data block with a higher reliability requirement. Alternatively, the $m_3$ data blocks may include a data block corresponding to a maximum MCS index in the N data blocks. A data block with a larger MCS index has a lower reliability requirement. In this manner, the UCI can be prevented from affecting transmission performance of a data block with a higher reliability requirement. Alternatively, the $m_3$ data blocks may include a data block whose corresponding latency-related parameter has a minimum value in the N data blocks. A latency-related parameter corresponding to a data block may indicate a latency requirement of the data block. A smaller value of the latency-related parameter corresponding to the data block may indicate a lower latency requirement of the data block. In this manner, the UCI can be prevented from affecting transmission performance of a data block with a higher latency requirement.

In a possible implementation, the method further includes: The terminal device receives indication information from the network device. The indication information indicates the $m_3$ data blocks.

In a possible implementation, the indication information further indicates a quantity of resource elements occupied by the UCI in each of the $m_3$ data blocks.

According to a second aspect, this application provides another information transmission method. The method may be performed by a network device, or may be performed by a chip used in a network device. The method includes: A network device receives an uplink data channel from a terminal device, and obtains uplink control information UCI from the uplink data channel. The uplink data channel carries N data blocks. The N data blocks include a first data block and a second data block. N is a positive integer greater than or equal to 2. The first data block is modulated based on a first modulation and coding scheme MCS, and the second data block is modulated based on a second MCS.

In this technical solution, on the one hand, the UCI is transmitted through the uplink data channel, which helps ensure reliability of downlink data transmission. On the other hand, compared with transmitting service data of the terminal device through one data block in the conventional art, the solution of transmitting service data of the terminal device through N data blocks helps ensure quality of service of the terminal device.

In a possible implementation, a time-frequency resource of the uplink data channel overlaps a time-frequency resource of the UCI.

In a possible implementation, time-frequency resources occupied by any two data blocks in the N data blocks partially overlap each other or do not overlap each other at all.

In this technical solution, time-frequency resources occupied by any two data blocks in the N data blocks do not overlap each other at all, so that all data blocks in the N data blocks can be distinguished in time domain or frequency domain. Compared with a manner of distinguishing data blocks based on a space resource (for example, a layer), this technical solution is more flexible.

In a possible implementation, the method further includes: The network device determines, based on a reliability-related parameter corresponding to an $n_3^{th}$ data block, a first parameter corresponding to the $n_3^{th}$ data block. Alternatively, the network device determines, based on a priority of the $n_3^{th}$ data block, a first parameter corresponding to the $n_3^{th}$ data block. The first parameter is for determining a value Q, to cause the value Q to be less than a sum of quantities of resource elements occupied by the N data blocks. The value Q is an upper limit of a quantity of resource elements that are on the uplink data channel and that are for transmitting the UCI, and Q is an integer greater than or equal to 1.

In a possible implementation, the method further includes: The network device sends indication information to the terminal device. The indication information indicates $m_3$ data blocks in the N data blocks, $1 \leq m_3 \leq N$, $m_3$ is a positive integer, and a time-frequency resource occupied by the UCI is included in a time-frequency resource corresponding to the $m_3$ data blocks.

In a possible implementation, the indication information further indicates a quantity of resource elements occupied by the UCI in each of the $m_3$ data blocks.

According to a third aspect, this application provides still another information transmission method. The method may be performed by a terminal device or may be performed by a chip used in a terminal device. The method includes: A terminal device determines UCI, and determines whether transmitting the UCI through an uplink data channel is allowed. The uplink data channel carries one data block. The terminal device determines, if transmitting the UCI through the uplink data channel is allowed, a quantity of resource elements that are on the uplink data channel and that are for transmitting the UCI, and sends the UCI to a network device through the uplink data channel. A time-frequency resource occupied by the UCI is included in a time-frequency resource corresponding to the data block carried on the uplink data channel.

In this technical solution, the UCI is transmitted through the uplink data channel, which helps ensure reliability of downlink data transmission.

In a possible implementation, the terminal device may determine, based on a quantity of bits corresponding to a data block carried on the uplink data channel and a quantity of bits occupied by the UCI, whether transmitting the UCI through the uplink data channel is allowed.

In a possible implementation, if a product of the quantity of bits corresponding to the data block carried on the uplink data channel and a coefficient A is greater than the quantity of bits occupied by the UCI, transmitting the UCI through the uplink data channel may be allowed.

In this technical solution, if the product of the quantity of bits corresponding to the data block carried on the uplink data channel and the coefficient A is greater than the quantity of bits occupied by the UCI, it indicates that the UCI occupies fewer bits. In this manner, even if the UCI is transmitted through the uplink data channel, the UCI does not occupy too many resources of the uplink data channel, which helps ensure normal transmission of service data carried on the uplink data channel during transmission of the UCI.

In a possible implementation, the terminal device may determine, based on spectral efficiency of the UCI and spectral efficiency of a data block carried on the uplink data channel, whether transmitting the UCI through the uplink data channel is allowed.

In a possible implementation, if spectral efficiency of the UCI is higher than spectral efficiency of a data block carried on an uplink data channel, transmitting the UCI through the uplink data channel may be allowed.

In this technical solution, that spectral efficiency of the UCI is higher than spectral efficiency of a data block carried on an uplink data channel indicates that a reliability requirement of the UCI is lower than a reliability requirement of the data block. In this way, when the UCI is transmitted through the uplink data channel, reliability of the UCI can be better ensured.

In a possible implementation, the terminal device may determine, based on a priority of the UCI and a priority of the uplink data channel, whether transmitting the UCI through the uplink data channel is allowed.

In a possible implementation, if the priority of the UCI is the same as the priority of the uplink data channel, transmitting the UCI through the uplink data channel may be allowed.

According to a fourth aspect, an embodiment of this application provides a communication apparatus. The communication apparatus has some or all functions of the terminal device in the method example in the first aspect. For example, functions of the communication apparatus may have some or all functions of embodiments of this application, or may have a function of independently implementing any embodiment in this application. The function may be implemented by hardware, or may be implemented by hardware executing corresponding software. The hardware or the software includes one or more units or modules corresponding to the functions.

In an implementation, a structure of the communication apparatus may include a transceiver module and a processing module. The processing module is configured to support the communication apparatus in performing corresponding functions in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes: a processing module, configured to determine uplink control information UCI; and a transceiver module, configured to send the UCI to a network device through an uplink data channel. The uplink data channel carries N data blocks. The N data blocks include a first data block and a second data block. N is a positive integer greater than or equal to 2. The first data block is modulated based on a first modulation and coding scheme MCS. The second data block is modulated based on a second MCS.

In an example, the processing module may be a processor, the transceiver module may be a transceiver, and the storage module may be a memory.

In an implementation, the communication apparatus includes: a processor, configured to determine uplink control information UCI; and a transceiver, configured to send the UCI to a network device through an uplink data channel. The uplink data channel carries N data blocks. The N data blocks include a first data block and a second data block. N is a positive integer greater than or equal to 2. The first data block is modulated based on a first modulation and coding scheme MCS. The second data block is modulated based on a second MCS.

According to a fifth aspect, an embodiment of this application provides another communication apparatus. The communication apparatus has some or all functions of the network device in the method example in the second aspect. For example, functions of the communication apparatus may have some or all functions of embodiments of this application, or may have a function of independently implementing any embodiment in this application. The function may be implemented by hardware, or may be implemented by hardware executing corresponding software. The hardware or the software includes one or more units or modules corresponding to the functions.

In an implementation, a structure of the communication apparatus may include a transceiver module and a processing module. The processing module is configured to support the communication apparatus in performing corresponding functions in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes: a transceiver module, configured to receive an uplink data channel from a terminal device, where the uplink data channel carries N data blocks, the N data blocks include a first data block and a second data block, N is a positive integer greater than or equal to 2, the first data block is modulated based on a first modulation and coding scheme MCS, and the second data block is modulated based on a second MCS; and a processing module, configured to obtain uplink control information UCI from the uplink data channel.

In an example, the processing module may be a processor, the transceiver module may be a transceiver, and the storage module may be a memory.

In an implementation, the communication apparatus includes: a transceiver, configured to receive an uplink data channel from a terminal device, where the uplink data channel carries N data blocks, the N data blocks include a first data block and a second data block, N is a positive integer greater than or equal to 2, the first data block is modulated based on a first modulation and coding scheme MCS, and the second data block is modulated based on a second MCS; and a processor, configured to obtain uplink control information UCI from the uplink data channel.

According to a sixth aspect, an embodiment of this application provides still another communication apparatus. The communication apparatus has some or all functions of the terminal device in the method example in the third aspect. For example, functions of the communication apparatus may have some or all functions of embodiments of this application, or may have a function of independently implementing any embodiment in this application. The function may be implemented by hardware, or may be implemented by hardware executing corresponding software. The hardware or the software includes one or more units or modules corresponding to the functions.

In an implementation, a structure of the communication apparatus may include a transceiver module and a processing module. The processing module is configured to support the communication apparatus in performing corresponding functions in the foregoing method. The transceiver module is configured to support communication between the communication apparatus and another device. The communication apparatus may further include a storage module. The storage module is configured to be coupled to the processing module and the transceiver module, and store a computer program and data that are necessary for the communication apparatus.

In an implementation, the communication apparatus includes: a processing module, configured to determine UCI, determine whether transmitting the UCI through an uplink data channel is allowed, and determine, if transmitting the UCI through the uplink data channel is allowed, a quantity of resource elements that are on the uplink data channel and that are for transmitting the UCI, where the uplink data channel carries one data block; and a transceiver module, configured to send the UCI to a network device through the uplink data channel, where a time-frequency resource occupied by the UCI is included in a time-frequency resource corresponding to the data block carried on the uplink data channel.

In an example, the processing module may be a processor, the transceiver module may be a transceiver, and the storage module may be a memory.

In an implementation, the communication apparatus includes: a processor, configured to determine UCI, determine whether transmitting the UCI through an uplink data channel is allowed, and determine, if transmitting the UCI through the uplink data channel is allowed, a quantity of resource elements that are on the uplink data channel and that are for transmitting the UCI, where the uplink data channel carries one data block; a transceiver, configured to send the UCI to a network device through the uplink data channel, where a time-frequency resource occupied by the UCI is included in a time-frequency resource corresponding to the data block carried on the uplink data channel.

According to a seventh aspect, an embodiment provides a computer-readable storage medium. The computer-readable storage medium stores a computer program. The computer program includes program instructions. When the program instructions are executed by a communication apparatus, the communication apparatus is enabled to perform the method according to the first aspect.

According to an eighth aspect, an embodiment provides a computer-readable storage medium. The computer-readable storage medium stores a computer program. The computer program includes program instructions. When the program instructions are executed by a communication apparatus, the communication apparatus is enabled to perform the method according to the second aspect.

According to a ninth aspect, an embodiment provides a computer-readable storage medium. The computer-readable storage medium stores a computer program. The computer program includes program instructions. When the program instructions are executed by a communication apparatus, the communication apparatus is enabled to perform the method according to the third aspect.

According to a tenth aspect, this application further provides a computer program product including a computer program. When the computer program product is run on a computer, the computer is enabled to perform the method according to the first aspect.

According to an eleventh aspect, this application further provides a computer program product including a computer program. When the computer program product is run on a computer, the computer is enabled to perform the method according to the second aspect.

According to a twelfth aspect, this application further provides a computer program product including a computer program. When the computer program product is run on a computer, the computer is enabled to perform the method according to the third aspect.

BRIEF DESCRIPTION OF DRAWINGS

FIG. 2 is a schematic flowchart of an information transmission method according to an embodiment of this application;

FIG. 3 is a schematic flowchart of another information transmission method according to an embodiment of this application;

DESCRIPTION OF EMBODIMENTS

Figure 1A:
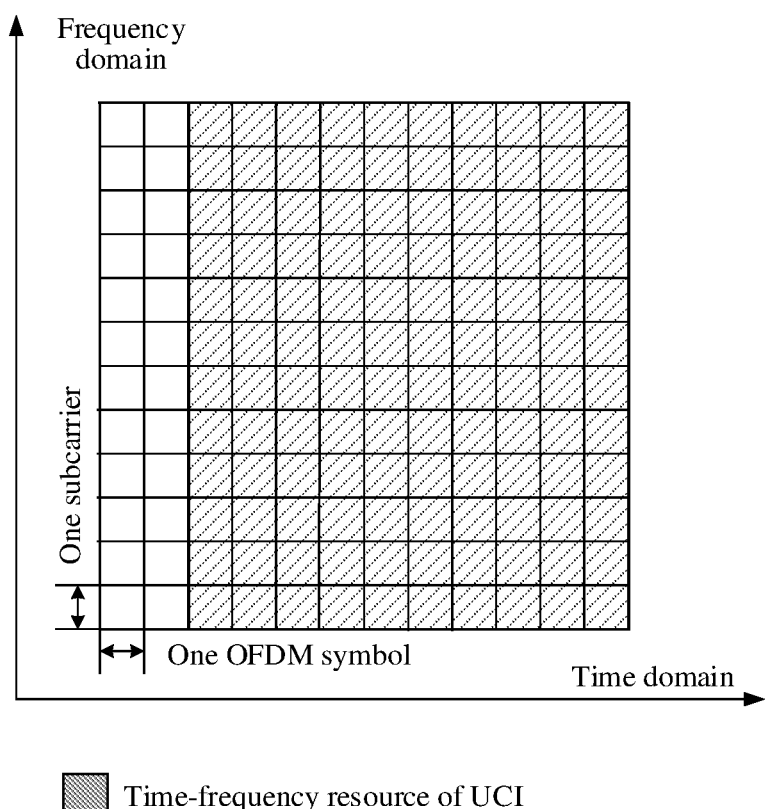
FIG. 1a is a schematic diagram of a scenario in which a time-frequency resource of an uplink data channel partially overlaps a time-frequency resource of UCI according to an embodiment of this application.

To better understand technical solutions provided in embodiments of this application, technical terms in embodiments of this application are first described.

1. Uplink Control Information (Uplink Control Information, UCI)

UCI may be carried on an uplink control channel or an uplink data channel. The UCI may include information related to a state of a current terminal device. For example, the UCI may include, but is not limited to, one or more of the following: an automatic repeat request-acknowledgment (hybrid automatic repeat request-acknowledgment, HARQ-ACK), configured grant uplink control information (configured grant uplink control information, CG-UCI), a channel state information (channel state information, CSI) part1, and a CSI part2.

2. Uplink Data Channel

In embodiments of this application, in addition to the UCI, an uplink data channel may further carry one or more data blocks. For related content of an uplink data channel carrying the UCI and one data block, refer to detailed descriptions in the embodiment of FIG. 6. For related content of an uplink data channel carrying the UCI and two data blocks, refer to detailed descriptions in the embodiments of FIG. 2 to FIG. 5. It should be noted that the embodiments of FIG. 2 to FIG. 5 are described by using an example in which an uplink data channel carries the UCI and two data blocks, and this example does not constitute a limitation on embodiments of this application. In another feasible implementation, the uplink data channel may alternatively carry the UCI and more than two data blocks.

The uplink data channel may be a physical uplink shared channel (physical uplink shared channel, PUSCH), and the PUSCH is for carrying uplink control information and/or service data. An uplink control channel may be a physical uplink control channel (physical uplink control channel, PUCCH), and the PUCCH is for carrying uplink control information.

3. Data Block; Resource Element

In an implementation, a data block may refer to a transport block (transport block, TB). A transport block is a basic unit for data exchange between a media access control (media access control, MAC) sublayer and a physical layer.

A resource element is the smallest resource unit in physical resources. The resource element may also be referred to as a resource element (resource element, RE). One RE represents one orthogonal frequency division multiplexing (orthogonal frequency division multiplexing, OFDM) symbol in time domain, and represents one subcarrier in frequency domain. In addition, the resource element may alternatively be another defined physical resource. For example, the resource element represents one OFDM symbol in time domain, and one RB (resource block, resource block) in frequency domain. This is not limited in this application.

4. Modulation and Coding Scheme (Modulation and Coding Scheme, MCS)

A physical transmission rate depends on a plurality of factors such as a modulation scheme (modulation), a coding rate (coding rate, code rate for short), and a quantity of spatial streams. A combination of these factors that affect the throughput results in a large quantity of physical transmission rates. Therefore, a concept of an MCS is provided in the conventional art. The MCS may specifically refer to specific schemes of a modulation scheme and a code rate that are used for transmission.

For ease of indication, the MCS may be specifically represented by a table, for example, Table 1. One MCS table may include at least one MCS, and each MCS has a corresponding MCS index. The MCS index uniquely identifies an MCS. The MCS may indicate a modulation scheme, a coding rate, spectral efficiency (spectral efficiency, SE), and the like. It should be noted that the MCS mentioned in embodiments of this application may refer to a modulation scheme and a code rate scheme, for example, may be a 64QAM modulation scheme and has a code rate of 0.5, or may be an MCS index. For the MCS table, the MCS index may also be referred to as an MCS number, and the two concepts of the MCS index and the MCS number are interchangeable. In Table 1, the second column $Q_m$ is a modulation order, the third column Rx represents a product of a code rate R and 1024, and R<1. For example, 30 in the first row and the third column in Table 1 represents R*1024, that is, the code rate R=30/1024=0.0293.

TABLE 1

| MCS index | Modulation order ($Q_m$) | Target code rate ($R_x$) | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | Reserved |
| 30 | 4 | | Reserved |
| 31 | 6 | | Reserved |

5. Spectral Efficiency of a Data Block; Spectral Efficiency of UCI

Spectral efficiency of a data block=modulation order corresponding to the data block*coding rate corresponding to the data block. The modulation order is a modulation order used by a modulation scheme corresponding to the data block. It may be understood that a determined MCS has corresponding spectral efficiency. The modulation scheme corresponding to the data block is a modulation scheme corresponding to the MCS index, and the coding rate corresponding to the data block is a coding rate corresponding to the MCS index. In other words, spectral efficiency of a data block may be determined based on an MCS index corresponding to the data block.

It should be noted that a smaller MCS index corresponding to a data block indicates lower spectral efficiency of the data block. For details, refer to Table 1. A larger MCS index corresponding to a data block indicates higher spectral efficiency of the data block. Lower spectral efficiency of a data block indicates a smaller MCS index corresponding to the data block. Higher spectral efficiency of a data block indicates a larger MCS index corresponding to the data block. It is generally considered that under a same channel condition, a data block with a smaller MCS index has a higher reliability requirement.

Spectral efficiency of UCI=modulation order corresponding to the UCI*coding rate corresponding to the UCI. The modulation order is a modulation order used by a modulation scheme corresponding to the UCI. In other words, spectral efficiency of UCI may be determined based on a modulation scheme and a coding rate that correspond to the UCI.

6. Priority of a Data Block; Priority of UCI; Priority of an Uplink Data Channel Currently, both a priority of an uplink data channel and a priority of UCI may be indicated by downlink control information (downlink control information, DCI), or may be indicated by higher layer signaling.

In embodiments of this application, a priority of an uplink data channel may be determined based on a priority of a data block carried on the uplink data channel. For example, when the uplink data channel carries one data block, the priority of the uplink data channel is the same as a priority of the data block. In embodiments of this application, the priority of the data block may be indicated by DCI or by higher layer signaling. When the uplink data channel carries a plurality of data blocks, the uplink data channel may have one or more priorities. For a manner of determining the priority of the uplink data channel, refer to detailed descriptions in the embodiment of FIG. 3. It should be noted that in embodiments of this application, an example in which the priorities include a high priority and a low priority is used for description, but does not constitute a limitation on embodiments of this application. In another feasible implementation, at least three priorities may be included. For example, a first priority, a second priority, and a third priority are included, where the first priority is higher than the second priority, and the second priority is higher than the third priority.

The higher layer signaling is signaling sent by a higher-layer protocol layer. The higher-layer protocol layer includes at least one protocol layer above a physical layer. The higher-layer protocol layer may include, but is not limited to, one or more of the following protocol layers: a media access control (media access control, MAC) layer, a radio link control (radio link control, RLC) layer, a packet data convergence protocol (packet data convergence protocol, PDCP) layer, a radio resource control (radio resource control, RRC) layer, or a non-access stratum (non-access stratum, NAS) layer.

7. Quantity of Bits Corresponding to a Data Block

If a data block is a TB, a quantity of bits corresponding to the data block is a quantity of information bits included in the TB. If a data block is not a TB, a quantity of bits corresponding to the data block may be a quantity of bits corresponding to information included in the data block.

A quantity of bits corresponding to K (K≥2) data blocks is a sum of quantities of bits corresponding to all data blocks in the K data blocks. For example, when the K data blocks include a data block 1, a data block 2, and a data block 3, a quantity of bits corresponding to the K data blocks=a quantity of bits corresponding to the data block 1+a quantity of bits corresponding to the data block 2+a quantity of bits corresponding to the data block 3.

In embodiments of this application, information included in a data block may be a payload (payload) included in the data block, or may be a payload and cyclic redundancy check (cyclic redundancy check, CRC) information included in the data block. Optionally, in embodiments of this application, a quantity of bits specifically refers to a quantity of bits before encoding.

8. Data Block Corresponding to a Maximum Quantity of Bits in N Data Blocks; Data Block Corresponding to a Minimum Quantity of Bits in the N Data Blocks In embodiments of this application, there may be one or more data blocks corresponding to a maximum quantity of bits in N data blocks carried on an uplink data channel. That there are a plurality of data blocks corresponding to a maximum quantity of bits in N data blocks indicates that:

Several data blocks in the N data blocks correspond to a same quantity of bits, and the quantity of bits is a maximum value in quantities of bits corresponding to all data blocks in the N data blocks. Likewise, that there are a plurality of data blocks corresponding to a minimum quantity of bits in N data blocks indicates that: Several data blocks in the N data blocks correspond to a same quantity of bits, and the quantity of bits is a minimum value in quantities of bits corresponding to all data blocks in the N data blocks. A data block corresponding to a maximum quantity of bits in the N data blocks is included in $t_1$ ($t_1 \geq 1$) data blocks. The following describes how to determine the $t_1$ data blocks.

If there are a plurality of data blocks corresponding to a maximum quantity of bits in the N data blocks, the $t_1$ data blocks include the plurality of data blocks (corresponding to a maximum quantity of bits). For example, the N data blocks include a data block 1, a data block 2, and a data block 3. If quantities of bits corresponding to the data block 1, the data block 2, and the data block 3 are 10 bits, 11 bits, and 13 bits respectively, the $t_1$ data blocks refer to the data block 3. If quantities of bits corresponding to the data block 1, the data block 2, and the data block 3 are respectively 10 bits, 12 bits, and 12 bits, the $t_1$ data blocks include the data block 2 and the data block 3.

If there are a plurality of data blocks corresponding to a maximum quantity of bits in the N data blocks, the $t_1$ data blocks include some data blocks (for example, $t_1$ data blocks) in the plurality of data blocks (corresponding to a maximum quantity of bits), where $t_1=1$, to be specific, the $t_1$ data blocks are one data block in the data blocks corresponding to a maximum quantity of bits. Optionally, a value of $t_1$ may be indicated by a network device or predefined.

Optionally, which data blocks in the plurality of data blocks (corresponding to a maximum quantity of bits) are used as the $t_1$ data blocks may be determined in the following manner: The $t_1$ data blocks are determined based on time-frequency resource positions in the plurality of data blocks (corresponding to a maximum quantity of bits). For example, ($t_1$) data blocks with highest time-frequency resource positions in the plurality of data blocks (corresponding to a maximum quantity of bits) are used as the $t_1$ data blocks. For example, the N data blocks include a data block 1, a data block 2, and a data block 3, and $t_1=1$. If quantities of bits corresponding to the data block 1, the data block 2, and the data block 3 are 10 bits, 12 bits, and 12 bits respectively, the $t_1$ data blocks refer to one of the data block 2 and the data block 3. If a time-frequency resource position corresponding to the data block 3 is higher than that of the data block 2, the $t_1$ data blocks are the data block 3.

It should be noted that the $t_1$ data blocks may refer to $m_1$ data blocks, $m_2$ data blocks, an $n_1^{th}$ data block ($t_1=1$), or an $n_3^{th}$ data block ($t_1=1$) mentioned in this embodiment of this application.

In this embodiment of this application, there may be one or more data blocks corresponding to a minimum quantity of bits in the N data blocks. A data block corresponding to a minimum quantity of bits in the N data blocks is included in $t_2$ ($t_2 \geq 1$) data blocks. The following describes how to determine the $t_2$ data blocks.

If there are a plurality of data blocks corresponding to a minimum quantity of bits in the N data blocks, the $t_2$ data blocks include the plurality of data blocks (corresponding to a minimum quantity of bits). For example, the N data blocks include a data block 1, a data block 2, and a data block 3. If quantities of bits corresponding to the data block 1, the data block 2, and the data block 3 are 10 bits, 11 bits, and 13 bits respectively, the $t_2$ data blocks refer to the data block 1. If quantities of bits corresponding to the data block 1, the data block 2, and the data block 3 are respectively 10 bits, 10 bits, and 12 bits, the $t_2$ data blocks include the data block 1 and the data block 2.

If there are a plurality of data blocks corresponding to a minimum quantity of bits in the N data blocks, the $t_2$ data blocks include some data blocks (for example, $t_2$ data blocks) in the plurality of data blocks (corresponding to a minimum quantity of bits), where $t_2=1$, to be specific, the $t_2$ data blocks are one data block in the data blocks corresponding to a minimum quantity of bits. Optionally, a value of $t_2$ may be indicated by a network device or predefined.

Optionally, which data blocks in the plurality of data blocks (corresponding to a minimum quantity of bits) are used as the $t_2$ data blocks may be determined in the following manner: The $t_2$ data blocks are determined based on time-frequency resource positions in the plurality of data blocks (corresponding to a minimum quantity of bits). For example, ($t_2$) data blocks with highest time-frequency resource positions in the plurality of data blocks (corresponding to a minimum quantity of bits) are used as the $t_2$ data blocks. For example, the N data blocks include a data block 1, a data block 2, and a data block 3, and $t_2=1$. If quantities of bits corresponding to the data block 1, the data block 2, and the data block 3 are 10 bits, 10 bits, and 12 bits respectively, the $t_2$ data blocks refer to one of the data block 1 and the data block 2. If a time-frequency resource position corresponding to the data block 2 is higher than that of the data block 1, the $t_2$ data blocks are the data block 2.

It should be noted that the $t_2$ data blocks may refer to $m_1$ data blocks, $m_2$ data blocks, an $n_1^{th}$ data block ($t_2=1$), or an $n_3^{th}$ data block ($t_2=1$) mentioned in embodiments of this application.

9. Precedence Relationship Between Positions of Two Time-Frequency Resources

In embodiments of this application, a precedence relationship between positions of two time-frequency resources may be determined based on $1^{st}$ symbols or last symbols of the two time-frequency resources. In other words, a precedence relationship between time-frequency resource positions is determined based on symbols occupied by time domain resources corresponding to the time-frequency resource positions.

For example, N data blocks include a first data block and a second data block. If a symbol index of a $1^{st}$ symbol of a time-frequency resource corresponding to the first data block is smaller than a symbol index of a $1^{st}$ symbol of a time-frequency resource corresponding to the second data block, it is considered that a time-frequency resource position corresponding to the first data block is higher than that of the second data block. Alternatively, if a symbol index of a last symbol of a time-frequency resource corresponding to the first data block is smaller than a symbol index of a last symbol of a time-frequency resource corresponding to the second data block, it is considered that a time-frequency resource position corresponding to the first data block is higher than that of the second data block. A symbol index of a symbol represents an index position of the symbol. It should be noted that, for two symbols (for example, a symbol 1 and a symbol 2), that a symbol index of the symbol 1 is smaller than a symbol index of the symbol 2 may also be described as that the symbol 1 is earlier than the symbol 2.

10. Two Time-Frequency Resources Overlap Each Other; Two Time-Frequency Resources do not Completely Overlap Each Other That two time-frequency resources (for example, a time-frequency resource of an uplink data channel and a time-frequency resource of UCI that are mentioned below) overlap each other may be described as that the two time-frequency resources partially or completely overlap each other. That the two time-frequency resources do not completely overlap each other may be described as that the two time-frequency resources partially do not overlap each other or do not overlap each other at all. That the two time-frequency resources partially do not overlap each other means that the two time-frequency resources overlap each other in other parts. In embodiments of this application, that the two time-frequency resources partially do not overlap each other may further be described as that the two time-frequency resources partially overlap each other. Similarly, that the two time-frequency resources partially overlap each other in embodiments of this application may also be described as that the two time-frequency resources partially do not overlap each other.

Time domain resource overlapping or frequency domain resource overlapping indicates that the two time-frequency resources overlap each other. Overlapping is classified into partial overlapping and complete overlapping. If time domain resources completely overlap each other, and frequency domain resources completely overlap each other, it indicates that the two time-frequency resources completely overlap each other. If time domain resources do not overlap each other at all, and frequency domain resources do not overlap each other at all, it indicates that the two time-frequency resources do not overlap each other at all. If the two time-frequency resources neither completely overlap each other, nor do not overlap other at all, it indicates that the two time-frequency resources partially overlap each other.

If time domain symbols (for example, OFDM symbols) corresponding to the two time-frequency resources are partially the same, it is considered that the two time-frequency resources partially overlap each other in time domain. If time domain symbols corresponding to the two time-frequency resources are completely the same, it is considered that the two time-frequency resources completely overlap each other in time domain. If time domain symbols corresponding to the two time-frequency resources are completely different, it is considered that the two time-frequency resources do not overlap each other at all in time domain. Similarly, if subcarriers or RBs corresponding to the two time-frequency resources are partially the same, it is considered that the two time-frequency resources partially overlap each other in frequency domain; if subcarriers or RBs corresponding to the two time-frequency resources are completely the same, it is considered that the two time-frequency resources completely overlap each other in frequency domain; or if subcarriers or RBs corresponding to the two time-frequency resources are completely different, it is considered that the two time-frequency resources do not overlap each other at all in frequency domain.

For example, the two time-frequency resources include a time-frequency resource of an uplink data channel and a time-frequency resource of UCI. FIG. 1a is a schematic diagram of a scenario in which the time-frequency resource of the uplink data channel and the time-frequency resource of the UCI partially overlap each other. A horizontal direction represents the time domain, a vertical direction represents the frequency domain, and one grid represents one RE. The time-frequency resource of the uplink data channel is represented by a gray-filled RE, and the time-frequency resource of the UCI is represented by a slash-filled RE.

It can be learned from FIG. 1a that, in time domain, a same OFDM symbol (a $3^{rd}$ OFDM symbol in FIG. 1a) is included in both OFDM symbols corresponding to the time-frequency resource of the uplink data channel and OFDM symbols corresponding to the time-frequency resource of the UCI. Therefore, the time-frequency resource of the uplink data channel and the time-frequency resource of the UCI partially overlap each other in time domain. In frequency domain, subcarriers corresponding to the time-frequency resource of the uplink data channel are completely the same as subcarriers corresponding to the time-frequency resource of the UCI. Therefore, the time-frequency resource of the uplink data channel and the time-frequency resource of the UCI completely overlap each other in frequency domain. In conclusion, the time-frequency resource of the uplink data channel partially overlaps the time-frequency resource of the UCI.

Figure 1B:
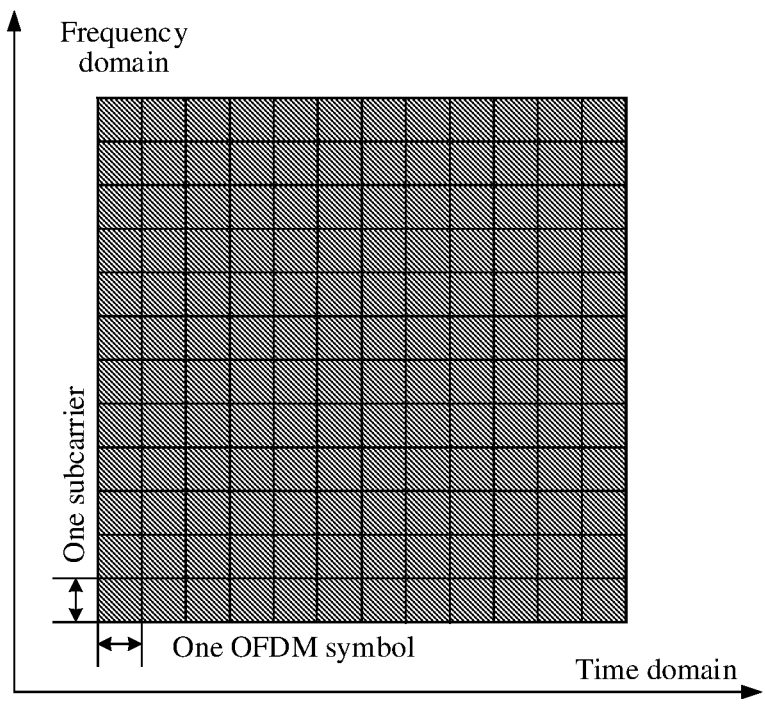
FIG. 1b is a schematic diagram of a scenario in which a time-frequency resource of an uplink data channel completely overlaps a time-frequency resource of UCI according to an embodiment of this application.

A schematic diagram of a scenario in which a time-frequency resource of an uplink data channel completely overlaps a time-frequency resource of UCI shown in FIG. 1b is used as an example for description. It can be learned from FIG. 1b that, in time domain, OFDM symbols corresponding to the time-frequency resource of the uplink data channel are completely the same as OFDM symbols corresponding to the time-frequency resource of the UCI. Therefore, the time-frequency resource of the uplink data channel and the time-frequency resource of the UCI completely overlap each other in time domain. In frequency domain, subcarriers corresponding to the time-frequency resource of the uplink data channel are completely the same as subcarriers corresponding to the time-frequency resource of the UCI. Therefore, the time-frequency resource of the uplink data channel and the time-frequency resource of the UCI completely overlap each other in frequency domain. In conclusion, the time-frequency resource of the uplink data channel completely overlaps the time-frequency resource of the UCI.

Figure 1C:
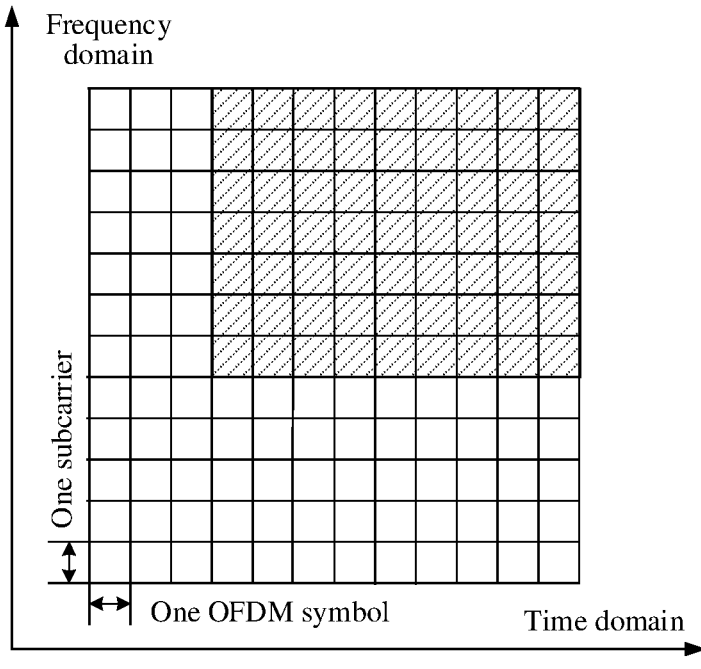
FIG. 1c is a schematic diagram of a scenario in which a time-frequency resource of an uplink data channel does not overlap a time-frequency resource of UCI at all according to an embodiment of this application.

A schematic diagram of a scenario in which a time-frequency resource of an uplink data channel does not overlap a time-frequency resource of UCI at all shown in FIG. 1c is used as an example for description. It can be learned from FIG. 1c that, in time domain, OFDM symbols corresponding to the time-frequency resource of the uplink data channel are completely different from OFDM symbols corresponding to the time-frequency resource of the UCI. Therefore, the time-frequency resource of the uplink data channel and the time-frequency resource of the UCI do not overlap each other at all in time domain. In frequency domain, subcarriers corresponding to the time-frequency resource of the uplink data channel are completely different from subcarriers corresponding to the time-frequency resource of the UCI. Therefore, the time-frequency resource of the uplink data channel and the time-frequency resource of the UCI do not overlap each other at all in frequency domain. In conclusion, the time-frequency resource of the uplink data channel does not overlap the time-frequency resource of the UCI at all.

To better understand the information transmission method disclosed in embodiments of this application, the following describes a communication system to which embodiments of this application are applicable.

Figure 1D:
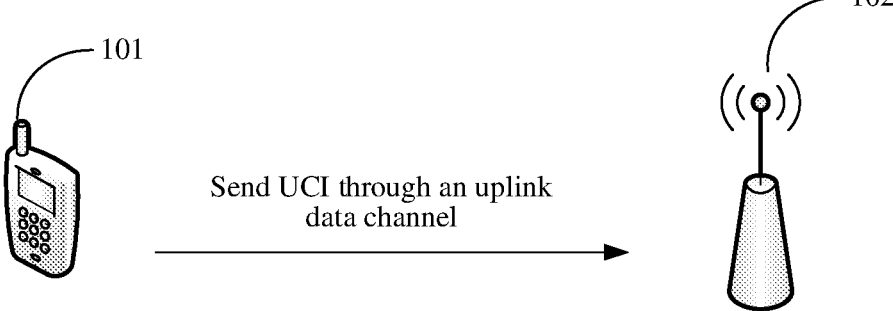
FIG. 1d is a schematic diagram of an architecture of a communication system according to an embodiment of this application.

FIG. 1d is a schematic diagram of an architecture of a communication system according to an embodiment of this application. The communication system may include, but is not limited to, one terminal device 101 and one network device 102. A quantity of and forms of devices shown in FIG. 1d are used as examples, and do not constitute a limitation on embodiments of this application. In an actual application, two or more terminal devices or two or more network devices may be included. For example, the communication system shown in FIG. 1d includes one terminal device 101 and one network device 102.

The terminal device 101 sends UCI to the network device through an uplink data channel, to prevent the UCI from being discarded, which helps ensure reliability of downlink data transmission. For example, the UCI includes automatic repeat request-acknowledgment (hybrid automatic repeat request-acknowledgment, HARQ-ACK) feedback information. The HARQ-ACK feedback information is for notifying the network device of whether the terminal device correctly receives downlink data previously sent by the network device. Therefore, the transmission of HARQ-ACK may be used by the network device to determine whether to retransmit the downlink data, to improve reliability of downlink data transmission.

The uplink data channel carries N data blocks. N is a positive integer greater than or equal to 2. Data blocks in the N data blocks are independently encoded. A meaning of independently encoding the data blocks is that the data blocks are modulated based on MCSs corresponding to the data blocks. For example, the N data blocks include a first data block and a second data block. The first data block is modulated based on a first MCS, and the second data block is modulated based on a second MCS. In embodiments of this application, MCSs corresponding to different data blocks may be the same or may be different. This is not limited in embodiments of this application.

Types of service data carried in different data blocks may be the same or may be different. The terminal device may determine, in the N data blocks based on a requirement of service data for a performance indicator such as reliability or a data rate, a specific data block in which the service data is to be carried. Compared with the conventional art in which all service data of the terminal device is transmitted through one data block, in embodiments of this application, all service data of the terminal device is transmitted through N data blocks, which helps ensure quality of service of services. Because different services have greatly different requirements for a performance indicator such as reliability, a latency, or a data rate, if data of all services run by the terminal device is transmitted through one data block, quality of service of the services is affected. It should be noted that a specific manner of transmitting all the service data of the terminal device through the N data blocks is not limited in embodiments of this application. For example, service data of one or more services run by the terminal device may be transmitted through one data block, and service data of one service may be transmitted through one or more data blocks.

The network device is configured to receive an uplink data channel from the terminal device, and obtain the UCI from the uplink data channel.

It should be noted that the technical solutions in embodiments of this application may be applied to various communication systems, for example, a long term evolution (long term evolution, LTE) system, a 5th generation (5th generation, 5G) mobile communication system, for example, a new radio (new radio, NR) system, or a system integrating multiple communication systems. Optionally, the technical solutions in embodiments of this application are further applicable to various future evolved communication systems.

The terminal device 101 in embodiments of this application is an entity configured to transmit or receive a signal. The terminal device may be referred to as a terminal (terminal), user equipment (user equipment, UE), a mobile station (mobile station, MS), a mobile terminal (mobile terminal, MT), or the like. The terminal device may be a mobile phone (mobile phone), a wearable device, a tablet computer (Pad), a computer having a wireless transceiver function, a virtual reality (virtual reality, VR) terminal device, or an augmented reality (augmented reality, AR) terminal device, a wireless terminal in industrial control (industrial control), a wireless terminal in self-driving (self-driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in smart home (smart home), or the like. A specific technology and a specific device form that are used by the terminal device are not limited in embodiments of this application.

The network device 102 in embodiments of this application is an entity that is configured to transmit or receive a signal and that is on a network side. The network device may be a radio access network (radio access network, RAN) device. The access network device may include a base station (base station, BS), and may be a device that is deployed in a radio access network and that can perform wireless communication with a terminal device. The base station may be in a plurality of forms such as a macro base station, a micro base station, a relay station, and an access point. For example, the access network device in embodiments of this application may be a base station in 5G or a base station in an LTE system. The base station in 5G may also be referred to as a transmission reception point (transmission reception point, TRP) or a next-generation NodeB (next generation NodeB, gNB). A specific technology and a specific device form used by the access network device are not limited in embodiments of this application.

It can be understood that the communication system described in embodiments of this application is for describing the technical solution in embodiments of this application more clearly, but does not limit the technical solution provided in embodiments of this application. A person skilled in the art may learn that with evolution of a system architecture and emergence of a new service scenario, the technical solutions provided in embodiments of this application is also applicable to a similar technical problem.

The following describes an information transmission method and an apparatus therefor provided in this application in detail with reference to the accompanying drawings.

FIG. 2 is a schematic flowchart of an information transmission method according to an embodiment of this application. Descriptions are provided below by using an example in which the information transmission method is performed by a terminal device and a network device. The method may include, but is not limited to, the following steps.

Step S201: A terminal device determines UCI.

The terminal device generates the UCI. The UCI may include one or more of a HARQ-ACK, CG-UCI, or CSI.

Step S202: The terminal device sends the UCI to a network device through an uplink data channel, where the uplink data channel carries N data blocks, the N data blocks include a first data block and a second data block, N is a positive integer greater than or equal to 2, the first data block is modulated based on a first MCS, and the second data block is modulated based on a second MCS.

The terminal device sends the UCI to the network device through the uplink data channel, to prevent the UCI from being discarded, which helps ensure reliability of downlink data transmission. It should be noted that sending the UCI to the network device through the uplink data channel refers to: carrying the UCI on a part or all of a time-frequency resource corresponding to the uplink data channel, and sending the UCI to the network device. Optionally, the UCI may be carried on a time-frequency resource corresponding to one or more data blocks in the N data blocks. Carrying the UCI on a time-frequency resource corresponding to one or more data blocks indicates that the UCI occupies the time-frequency resource corresponding to the one or more data blocks. It should be noted that the UCI occupying a time-frequency resource corresponding to a data block indicates that the UCI occupies a part or all of the time-frequency resource corresponding to the data block. For related content about carrying the UCI on a time-frequency resource corresponding to which data block or data blocks in the N data blocks and sending the UCI to the network device, refer to detailed descriptions in the embodiment of FIG. 5. It may be understood that, after receiving the uplink data channel from the terminal device, the network device may obtain the UCI from the uplink data channel. Compared with transmitting all service data of the terminal device through one data block, in embodiments of this application, all service data of the terminal device is transmitted through N data blocks, which helps ensure quality of service of services.

In this embodiment of this application, the terminal device may receive indication information 1 from the network device. The indication information 1 indicates a time-frequency resource of the uplink data channel. The indication information 1 may be DCI. Optionally, the indication information 1 further indicates the first MCS and/or the second MCS. Optionally, the indication information 1 further indicates a time-frequency resource corresponding to at least one data block in the N data blocks.

In addition to carrying N data blocks, the uplink data channel may further carry a demodulation reference signal (demodulation reference signal, DMRS). For example, the N data blocks include the first data block and the second data block. The indication information 1 may specifically indicate a time-frequency resource corresponding to the DMRS, a time-frequency resource corresponding to the first data block, and/or a time-frequency resource corresponding to the second data block. The time-frequency resource corresponding to the DMRS, the time-frequency resource corresponding to the first data block, and the time-frequency resource corresponding to the second data block are all included in the time-frequency resource of the uplink data channel. The time-frequency resource corresponding to the first data block and the time-frequency resource corresponding to the second data block may overlap each other or may not overlap each other. This is not limited in this embodiment of this application. The DMRS may be for demodulating the PUSCH.

In an implementation, time-frequency resources of at least two data blocks in the N data blocks may be indicated by same DCI, or at least two data blocks in the N data blocks are scheduled by using same DCI. Each of the N data blocks is independently encoded. Time-frequency resources of at least two data blocks in the N independently encoded data blocks may be indicated by same DCI, or at least two data blocks in the N independently encoded data blocks are scheduled by using same DCI.

In an implementation, time-frequency resources occupied by any two data blocks in the N data blocks may partially overlap each other or do not overlap each other at all. Time-frequency resources occupied by any two data blocks in the N data blocks do not overlap each other at all, so that the data blocks in the N data blocks can be distinguished in time domain or frequency domain and do not need to be distinguished in spatial domain. In this embodiment of this application, different data blocks may occupy different time-frequency resources. Compared with distinguishing different data blocks by using spatial resources (for example, a layer), this embodiment of this application is more flexible.

It should be noted that time-frequency resources occupied by any two data blocks in the N data blocks partially overlapping each other or not overlapping each other at all may also be described as that time-frequency resources occupied by any two data blocks in the N data blocks do not completely overlap.

In an implementation, a time-frequency resource of the uplink data channel overlaps a time-frequency resource of the UCI. The time-frequency resource of the UCI may be included in the time-frequency resource of the uplink control channel. That a time-frequency resource of the uplink data channel overlaps a time-frequency resource of the UCI may indicate that the time-frequency resource of the uplink data channel overlaps the time-frequency resource of the uplink control channel. Alternatively, that a time-frequency resource of the uplink data channel overlaps a time-frequency resource of the UCI may indicate that a time domain resource corresponding to the uplink data channel overlaps a time domain resource corresponding to the UCI, and/or that a frequency domain resource corresponding to the uplink data channel overlaps a frequency domain resource corresponding to the UCI. In this case, the UCI is carried on the uplink data channel for transmission. Optionally, the time-frequency resource of the UCI may be indicated by indication information 2 from the network device. In another implementation, a time-frequency resource of the uplink data channel does not overlap a time-frequency resource of the UCI at all. When the time-frequency resource of the uplink data channel does not overlap the time-frequency resource of the UCI at all, the terminal device sends the UCI through the uplink data channel. In this manner, the terminal device can transmit the data block and the UCI by sending the uplink data channel, which helps improve resource utilization.

Optionally, the terminal device may determine whether the time-frequency resource of the uplink data channel overlaps the time-frequency resource of the UCI. If the time-frequency resource of the uplink data channel overlaps the time-frequency resource of the UCI, the UCI may be transmitted through the uplink data channel. If the time-frequency resource of the uplink data channel does not overlap the time-frequency resource of the UCI at all, the UCI may be transmitted through the uplink control channel.

In an implementation, the UCI (that is, the UCI sent through the uplink data channel) does not include CSI (for example, a CSI part1 and a CSI part2). In other words, the UCI does not include the CSI, and sending the UCI through the uplink data channel may be allowed. In another implementation, the UCI does not include CSI, and whether sending the UCI through the uplink data channel is allowed may be determined in the manner described in step S302 in the embodiment of FIG. 3. It may be understood that if the UCI includes CSI, sending the UCI through an uplink data channel is not allowed.

In an implementation, the UCI includes a HARQ-ACK and/or CG-UCI, and sending the UCI through the uplink data channel may be allowed. In another implementation, the UCI includes a HARQ-ACK and/or CG-UCI, and whether sending the UCI through the uplink data channel is allowed may be determined in the manner described in step S302 in the embodiment of FIG. 3.

Through this embodiment of this application, the UCI can be prevented from being discarded, which helps ensure reliability of downlink data transmission. In addition, in this embodiment of this application, service data of the terminal device is transmitted through N data blocks, which helps ensure quality of service of services.

FIG. 3 is a schematic flowchart of another information transmission method according to an embodiment of this application. The method describes in detail a specific condition that the UCI meets for transmission through an uplink data channel. Descriptions are provided below by using an example in which the information transmission method is performed by a terminal device and a network device. The method may include, but is not limited to, the following steps.

Step S301: A terminal device determines UCI.

It should be noted that, for an execution process of step S301, refer to detailed descriptions of step S201 in FIG. 2. Details are not described herein again.

Step S302: The terminal device sends the UCI to a network device through an uplink data channel, where the uplink data channel carries N data blocks, the N data blocks include a first data block and a second data block, N is a positive integer greater than or equal to 2, the first data block is modulated based on a first MCS, and the second data block is modulated based on a second MCS; and a quantity of bits occupied by the UCI is less than $A*B$, $A \geq 0$, and B is a quantity of bits corresponding to at least one data block in the N data blocks.

In this embodiment of this application, that the quantity of bits occupied by the UCI is less than $A*B$ indicates that the UCI occupies fewer bits. For example, the N data blocks include a data block 1 and a data block 2, B is a quantity of bits corresponding to the data block 1, and $A=0.5$. In this case, the quantity of bits occupied by the UCI is less than (the quantity of bits corresponding to the data block 1 divided by 2). In this case, even if the UCI is transmitted through the uplink data channel, the UCI does not occupy too many resources of the uplink data channel, which helps ensure normal transmission of service data carried on the data block during transmission of the UCI. Therefore, transmitting the UCI through the uplink data channel may be allowed. It may be understood that, if the quantity of bits occupied by the UCI is greater than or equal to $A*B$, transmitting the UCI through the uplink data channel may not be allowed. A is a coefficient, and A may be indicated by the network device or predefined. B is a quantity of bits corresponding to at least one data block in the N data blocks. When the at least one data block includes one data block, B is a quantity of bits corresponding to the data block. When the at least one data block includes a plurality of data blocks, B is a sum of quantities of bits corresponding to all data blocks in the plurality of data blocks. For example, when the N data blocks include a data block 1, a data block 2, and a data block 3, and B is a quantity of bits corresponding to the data block 1 and the data block 2, B=a quantity of bits corresponding to the data block 1+a quantity of bits corresponding to the data block 2. Optionally, B is determined based on a sum of quantities of bits of N data blocks included in the uplink data channel. For example, the uplink data channel includes two data blocks: a data block 1 and a data block 2. The data block 1 corresponds to 5-bit information, and the data block 2 corresponds to 10-bit information. In this case, B is 5 plus 10, which is 15 bits.

In other words, the terminal device may determine, in the following manner, whether transmitting the UCI through the uplink data channel is allowed: determining, based on a quantity of bits occupied by the UCI and a quantity of bits corresponding to at least one data block in the N data blocks, whether transmitting the UCI through the uplink data channel is allowed. For example, if the quantity of bits occupied by the UCI is less than $A*B$, transmitting the UCI through the uplink data channel may be allowed. When the UCI is transmitted on the uplink data channel, a time-frequency resource of the uplink data channel needs to be occupied. In other words, time-frequency resources that are on the uplink data channel and that are originally for transmitting data blocks may be reduced. Through this solution, a quantity of bits of the UCI allowed to be transmitted through the uplink data channel can be limited, so that the UCI can be prevented from occupying all resources of the uplink data channel and causing a failure of data block transmission. It should be noted that, for the remaining execution process of step S302, refer to detailed descriptions of step S202 in FIG. 2. Details are not described herein again.

In an implementation, B is a quantity of bits corresponding to $m_1$ data blocks, $1 \leq m_1 \leq N$, $m_1$ is a positive integer, and the $m_1$ data blocks belong to the foregoing N data blocks. When $m_1=1$, B is a quantity of bits corresponding to one data block. When $m_1>1$, B is a sum of quantities of bits corresponding to all data blocks in the $m_1$ data blocks.

In an implementation, the $m_1$ data blocks may be determined based on a quantity of bits corresponding to at least one data block in the N data blocks. Optionally, the $m_1$ data blocks may include a data block corresponding to a maximum quantity of bits in the N data blocks, or the $m_1$ data blocks may include a data block corresponding to a minimum quantity of bits in the N data blocks. If the $m_1$ data blocks include a data block corresponding to a maximum quantity of bits in the N data blocks, and there are a plurality of data blocks corresponding to a maximum quantity of bits in the N data blocks, the plurality of data blocks (corresponding to a maximum quantity of bits) are the $m_1$ data blocks; or some data blocks (for example, $m_1$ data blocks) in the plurality of data blocks (corresponding to a maximum quantity of bits) are the $m_1$ data blocks, where $m_1=1$, to be specific, the $m_1$ data blocks are one data block in data blocks corresponding to a maximum quantity of bits. Optionally, if there are a plurality of data blocks corresponding to a maximum quantity of bits in the N data blocks, which data blocks in the plurality of data blocks (corresponding to a maximum quantity of bits) are used as the $m_1$ data blocks may be determined in the following manner: $(m_1)$ data blocks with highest time-frequency resource positions in the plurality of data blocks (corresponding to a maximum quantity of bits) are used as the $m_1$ data blocks.

If the $m_1$ data blocks include a data block corresponding to a minimum quantity of bits in the N data blocks, and there are a plurality of data blocks corresponding to a minimum quantity of bits in the N data blocks, the plurality of data blocks (corresponding to a minimum quantity of bits) are the $m_1$ data blocks; or some data blocks in the plurality of data blocks (corresponding to a minimum quantity of bits) are the $m_1$ data blocks. Optionally, if there are a plurality of data blocks corresponding to a minimum quantity of bits in the N data blocks, which data blocks in the plurality of data blocks (corresponding to a minimum quantity of bits) are used as the $m_1$ data blocks may be determined in the following manner: $(m_1)$ data blocks with highest time-frequency resource positions in the plurality of data blocks (corresponding to a minimum quantity of bits) are used as the $m_1$ data blocks.

In another implementation, the $m_1$ data blocks may be determined based on a priority of at least one data block in the N data blocks. Optionally, the $m_1$ data blocks may include a data block with a high priority in the N data blocks. If there are a plurality of data blocks whose priority is a high priority in the N data blocks, the plurality of data blocks are the $m_1$ data blocks. For example, the N data blocks include a data block 1, a data block 2, and a data block 3. If priorities of the data block 1, the data block 2, and the data block 3 are a low priority, a low priority, and a high priority respectively, the $m_1$ data blocks refer to the data block 3. If priorities of the data block 1, the data block 2, and the data block 3 are a low priority, a high priority, and a high priority respectively, the $m_1$ data blocks include the data block 2 and the data block 3. If there are a plurality of data blocks whose priority is a high priority in the N data blocks, some data blocks in the plurality of data blocks are the $m_1$ data blocks. Optionally, if there are a plurality of data blocks with a high priority in the N data blocks, which data blocks in the plurality of data blocks (with a high priority) are used as the $m_1$ data blocks may be determined in the following manner: ($m_1$) data blocks with highest time-frequency resource positions in the plurality of data blocks (with a high priority) are used as the $m_1$ data blocks. For example, the N data blocks include a data block 1, a data block 2, and a data block 3, and $m_1 = 1$. If priorities of the data block 1, the data block 2, and the data block 3 are a low priority, a high priority, and a high priority respectively, the $m_1$ data blocks refer to one of the data block 2 and the data block 3. If a time-frequency resource position corresponding to the data block 3 is higher than that of the data block 2, the $m_1$ data blocks are the data block 3.

In still another implementation, the $m_1$ data blocks may be determined based on a priority of the UCI and a priority of at least one data block in the N data blocks. Optionally, the $m_1$ data blocks may include a data block whose priority is the same as that of the UCI in the N data blocks. If there are a plurality of data blocks whose priority is the same as the priority of the UCI in the N data blocks, the plurality of data blocks are the $m_1$ data blocks, or some data blocks in the plurality of data blocks are the $m_1$ data blocks. Optionally, if there are a plurality of data blocks whose priority is the same as the priority of the UCI in the N data blocks, which data blocks in the plurality of data blocks are used as the $m_1$ data blocks may be determined in the following manner: ($m_1$) data blocks with highest time-frequency resource positions in the plurality of data blocks are used as the $m_1$ data blocks.

In an implementation, spectral efficiency of the UCI is higher than spectral efficiency of an $n_1^{th}$ data block, $1 \le n_1 \le N$, and $n_1$ is a positive integer. The $n_1^{th}$ data block belongs to the N data blocks. The spectral efficiency of the UCI is spectral efficiency of the UCI before the UCI and the uplink data channel are sent in a multiplexed manner, instead of spectral efficiency of the UCI after the UCI and the uplink data channel are sent in a multiplexed manner. That spectral efficiency of the UCI is higher than spectral efficiency of an $n_1^{th}$ data block indicates that a reliability requirement of the UCI is lower than a reliability requirement of the $n_1^{th}$ data block. In this embodiment of this application, a manner of ensuring reliability may include, but is not limited to, lowering a coding rate and lowering a modulation order. The reliability requirement of the UCI is lower than the reliability requirement of the $n_1^{th}$ data block. In this way, when the UCI is transmitted through the uplink data channel, reliability of the UCI can be better ensured. It may be understood that, the terminal device may determine, in the following manner, whether transmitting the UCI through the uplink data channel is allowed: determining, based on spectral efficiency of the UCI and spectral efficiency of an $n_1^{th}$ data block, whether transmitting the UCI through the uplink data channel is allowed. For example, if the spectral efficiency of the UCI is higher than spectral efficiency of the $n_1^{th}$ data block, transmitting the UCI through the uplink data channel may be allowed. If spectral efficiency of the UCI is less than or equal to spectral efficiency of the nit data block, transmitting the UCI through the uplink data channel may not be allowed.

In an implementation, the $n_1$ data block may be determined based on spectral efficiency of at least one data block in the N data blocks. For example, the $n_1^{th}$ data block is a data block with highest or lowest spectral efficiency in the N data blocks. If there are a plurality of data blocks with highest (or lowest) spectral efficiency in the N data blocks, the $n_1^{th}$ data block may be a data block with a highest time-frequency resource position in the plurality of data blocks with highest (or lowest) spectral efficiency. That there are a plurality of data blocks with highest spectral efficiency in N data blocks indicates that: Several data blocks in the N data blocks have same spectral efficiency, and the spectral efficiency is a maximum value in spectral efficiency of all data blocks in the N data blocks. Likewise, that there are a plurality of data blocks with lowest spectral efficiency in N data blocks indicates that: Several data blocks in the N data blocks have same spectral efficiency, and the spectral efficiency is a minimum value in spectral efficiency of all data blocks in the N data blocks.

In an implementation, the $n_1^{th}$ data block may be determined based on an MCS corresponding to at least one data block in the N data blocks. For example, the $n_1^{th}$ data block is a data block corresponding to a maximum or minimum MCS index in the N data blocks. If there are a plurality of data blocks corresponding to a maximum (or minimum) MCS index in the N data blocks, the $n_1^{th}$ data block may be a data block with a highest time-frequency resource position in the plurality of data blocks corresponding to the maximum (or minimum) MCS index. That there are a plurality of data blocks corresponding to a maximum MCS index in N data blocks indicates that: Several data blocks in the N data blocks correspond to a same MCS index, and the MCS index is a maximum value in MCS indexes corresponding to all data blocks in the N data blocks. Likewise, that there are a plurality of data blocks corresponding to a minimum MCS index in N data blocks indicates that: Several data blocks in the N data blocks correspond to a same MCS index, and the MCS index is a minimum value in MCS indexes corresponding to all data blocks in the N data blocks.

In an implementation, the $n_1^{th}$ data block may be determined based on a priority of at least one data block in the N data blocks and a priority of the UCI. For example, the priority of the $n_1^{th}$ data block is the same as the priority of the UCI. If there are a plurality of data blocks whose priority is the same as the priority of the UCI in the N data blocks, the $n_1^{th}$ data block may be a data block with a highest time-frequency resource position in the plurality of data blocks. In an implementation, the $n_1^{th}$ data block may be determined based on a quantity of bits corresponding to at least one data block in the N data blocks. For example, the $n_1^{th}$ data block is a data block corresponding to a maximum quantity of bits or a minimum quantity of bits in the N data blocks. If there are a plurality of data blocks corresponding to a maximum quantity of bits in the N data blocks, the $n_1^{th}$ data block may be a data block with a highest time-frequency resource position in the plurality of data blocks corresponding to the maximum quantity of bits. If there are a plurality of data blocks corresponding to a minimum quantity of bits in the N data blocks, the $n_1^{th}$ data block may be a data block with a highest time-frequency resource position in the plurality of data blocks corresponding to the minimum quantity of bits.

In an implementation, a priority of the UCI is the same as a priority of the uplink data channel; or a priority of the UCI is the same as a priority of at least one data block in the N data blocks. It may be understood that, the terminal device may determine, in the following manner, whether transmitting the UCI through the uplink data channel is allowed: determining, based on a priority of the UCI, whether transmitting the UCI through the uplink data channel is allowed. For example, when the priority of the UCI is the same as a priority of the uplink data channel, or the priority of the UCI is the same as a priority of at least one data block in the N data blocks, transmitting the UCI through the uplink data channel may be allowed. For another example, when the priority of the UCI is different from a priority of the uplink data channel, or the priority of the UCI is the same as none of priorities of all data blocks in the N data blocks, transmitting the UCI through the uplink data channel may not be allowed.

In this embodiment of this application, the uplink data channel may have one or more priorities. The priority of the uplink data channel may be determined in the following manners: Manner 1: The priority of the uplink data channel is indicated by DCI. Manner 2: The priority of the uplink data channel is pre-specified. For example, it is pre-specified that an uplink data channel carrying N independently coded data blocks has a high priority, where $N \geq 2$. In this manner, regardless of how the DCI indicates the priority of the uplink data channel, the priority of the uplink data channel is not affected. In an implementation, if it is pre-specified that the uplink data channel has a high priority, when the priority of the UCI is a high priority, transmitting the UCI through the uplink data channel may be allowed. Manner 3: The priority of the uplink data channel is determined based on priorities of the N data blocks carried on the uplink data channel. For example, if the N data blocks all have a high priority, the uplink data channel has a high priority. If the N data blocks all have a low priority, the uplink data channel has a low priority. If the N data blocks include a data block with a high priority and a data block with a low priority, the uplink data channel has both a high priority and a low priority. In this case, the uplink data channel has two priorities. Optionally, a priority of a data block may be indicated by DCI.

In an implementation, the N data blocks include a data block with a high priority and a data block with a low priority, and transmitting the UCI through an uplink data channel may also be allowed. Because the priority of the UCI is a high priority or a low priority, if the N data blocks include a data block with a high priority and a data block with a low priority, it indicates that the priority of the UCI is the same as a priority of at least one data block in the N data blocks. For example, the N data blocks include a data block 1 and a data block 2, and priorities of the data block 1 and the data block 2 are respectively a high priority and a low priority. If the UCI has a low priority, apparently, the priority of the UCI is the same as the priority of the data block 2. If the UCI has a high priority, apparently, the priority of the UCI is the same as the priority of the data block 1. That is, when the N data blocks include a data block with a high priority and a data block with a low priority, the priority of the UCI is the same as a priority of at least one data block of the N data blocks. Therefore, transmitting the UCI through the uplink data channel may be allowed.

With reference to the foregoing content, it can be learned that the terminal device may further determine, in the following manner, whether transmitting the UCI through the uplink data channel is allowed: determining, based on a priority of the UCI and a priority of the uplink data channel, whether transmitting the UCI through the uplink data channel is allowed; or determining, based on a priority of the UCI and a priority of at least one data block in the N data blocks, whether transmitting the UCI through the uplink data channel is allowed (for example, if there is a data block whose priority is the same as the priority of the UCI in the N data blocks, transmitting the UCI through the uplink data channel may be allowed); or determining, based on priorities of at least two data blocks in the N data blocks, whether transmitting the UCI through the uplink data channel is allowed. For example, if the N data blocks include a data block with a high priority and a data block with a low priority, transmitting the UCI through the uplink data channel may be allowed.

In an implementation, the terminal device may determine, based on a quantity of data blocks carried on the uplink data channel, whether transmitting the UCI through the uplink data channel is allowed. For example, if the quantity of data blocks carried on the uplink data channel is greater than or equal to 2, transmitting the UCI on the uplink data channel is not allowed. If two or more data blocks are carried on one uplink data channel, it indicates that transmission of the data blocks is urgent. Because when the UCI is transmitted on the uplink data channel, a time-frequency resource of the uplink data channel needs to be occupied, time-frequency resources that are on the uplink data channel and that are originally for transmitting data blocks may be reduced. Transmitting the UCI on the uplink data channel is not allowed, so that the UCI can be prevented from affecting transmission of urgent data.

In an implementation, the UCI mentioned in the embodiment of FIG. 3 may not include CSI, or in other words, may include a HARQ-ACK and/or CG-UCI. When the UCI includes a HARQ-ACK and/or CG-UCI, if a quantity of bits occupied by the UCI is less than A*B, transmitting the UCI through the uplink data channel carrying the N data blocks is allowed; if spectral efficiency of the UCI is higher than spectral efficiency of an $n_1^{th}$ data block, transmitting the UCI through the uplink data channel is allowed; if a priority of the UCI is the same as a priority of the uplink data channel, transmitting the UCI through the uplink data channel is allowed; if a priority of the UCI is the same as a priority of at least one data block in the N data blocks, transmitting the UCI through the uplink data channel is allowed; or if the N data blocks include a data block with a high priority and a data block with a low priority, transmitting the UCI through the uplink data channel is allowed.

In this embodiment of this application, when a quantity of bits occupied by the UCI is less than A*B, transmitting the UCI through the uplink data channel may be allowed. In this manner, even if the UCI is transmitted through the uplink data channel, the UCI does not occupy too many resources of the uplink data channel, which helps ensure normal transmission of service data carried on the data block during transmission of the UCI.

Figure 4:
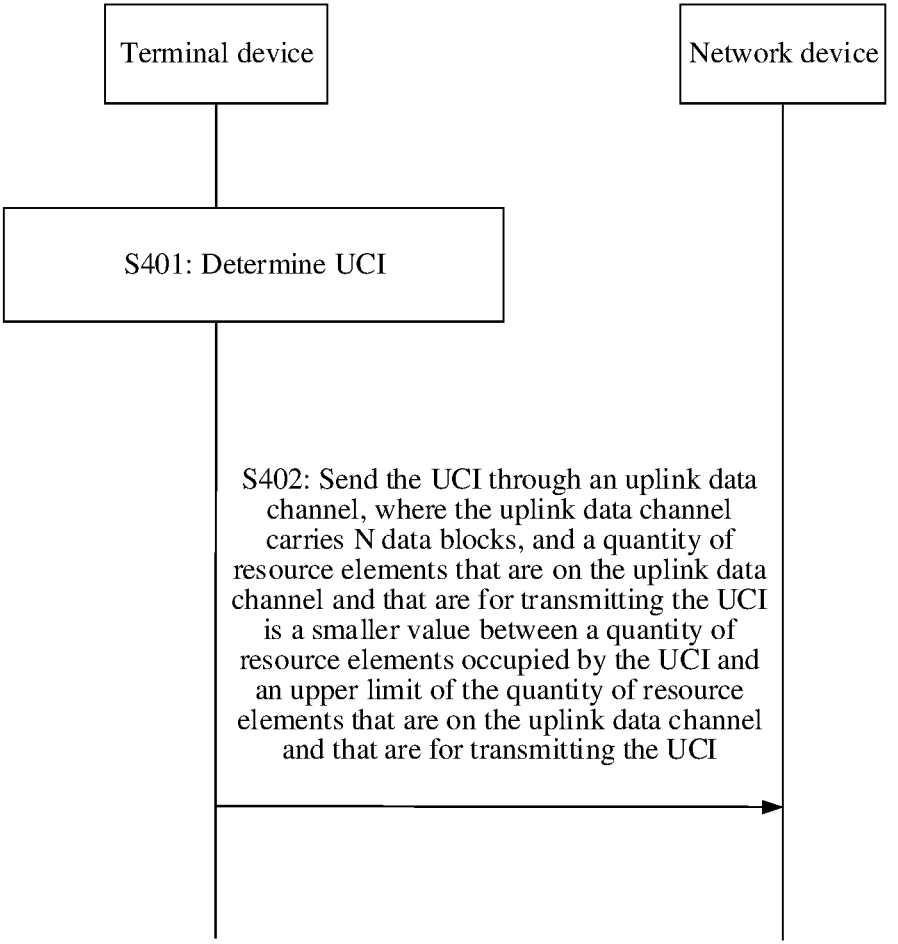
FIG. 4 is a schematic flowchart of still another information transmission method according to an embodiment of this application.

FIG. 4 is a schematic flowchart of still another information transmission method according to an embodiment of this application. In the method, how to determine a quantity of resource elements that are on an uplink data channel and that are for transmitting UCI is described in detail. Descriptions are provided below by using an example in which the information transmission method is performed by a terminal device and a network device. The method may include, but is not limited to, the following steps.

Step S401: A terminal device determines UCI.

Step S402: The terminal device sends the UCI to a network device through an uplink data channel, where the uplink data channel carries N data blocks, the N data blocks include a first data block and a second data block, N is a positive integer greater than or equal to 2, the first data block is modulated based on a first MCS, and the second data block is modulated based on a second MCS; and a quantity of resource elements that are on the uplink data channel and that are for transmitting the UCI is a smaller value between a quantity of resource elements occupied by the UCI and an upper limit of the quantity of resource elements that are on the uplink data channel and that can be for transmitting the UCI.

In this application, for example, the quantity of resource elements occupied by the UCI is represented by a value P, and the upper limit of the quantity of resource elements that are on the uplink data channel and that can be for transmitting the UCI is represented by a value Q. The value P may be understood as a quantity of resource elements that the UCI needs to occupy, and the value Q may be understood as an upper limit of a quantity of resource elements that the UCI is allowed to occupy on the uplink data channel. In other words, the value Q is for limiting a quantity of resource elements that the UCI occupies on the uplink data channel. The quantity of resource elements that are on the uplink data channel and that are for transmitting the UCI is a quantity of resource elements actually occupied by the UCI on the uplink data channel when the UCI is transmitted through the uplink data channel. If the value P is less than the value Q, the quantity of resource elements actually occupied by the UCI on the uplink data channel is the value Q rather than the value P. In this case, the quantity of resource elements actually occupied by the UCI on the uplink data channel is not the quantity of resource elements that the UCI needs to occupy, but is less than the quantity of resource elements that the UCI needs to occupy. The quantity of resource elements that are on the uplink data channel and that are for transmitting the UCI may also be described as a quantity of resource elements that are in a time-frequency resource 1 and that are for transmitting the UCI, and the time-frequency resource 1 is a time-frequency resource of the uplink data channel. In this embodiment of this application, after determining the value P and the value Q, the terminal device may determine a smaller value between the value P and the value Q as the quantity of resource elements that are on the uplink data channel and that are for transmitting the UCI. The value P and the value Q are respectively integers greater than or equal to 1.

In this embodiment of this application, the value P may be determined in, but is not limited to, two manners. In the first manner, the value P may be determined based on a quantity of bits corresponding to at least one data block in the N data blocks. Specifically, the value P may be determined based on a quantity of bits corresponding to $m_2$ data blocks in the N data blocks, $1 \leq m_2 \leq N$, and $m_2$ is a positive integer. When $m_2=1$, the value P may be determined based on a quantity of bits corresponding to one data block. When $m_2 > 1$, the value P may be determined based on a sum of quantities of bits corresponding to all data blocks in the $m_2$ data blocks. The value P may be determined based on the following formula:

28

$$\text{Value } P = \left\lceil \frac{(O+L) * \beta_{offset}^{uplink\ data\ channel} * E}{F} \right\rceil, \tag{1}$$

where $\lceil \ \rceil$ is a rounding up symbol, O represents a quantity of bits occupied by a payload included in the UCI, L represents a quantity of bits occupied by CRC information of the UCI, $\beta_{offset}^{uplinkdatachannel}$ is determined based on DCI, E represents a quantity of all REs that are in a resource of the uplink data channel and that can be for transmitting the UCI, and F represents a quantity of bits corresponding to the $m_2$ data blocks.

In an implementation, the $m_2$ data blocks may be determined based on a priority of at least one data block in the N data blocks and a priority of the UCI. For example, the $m_2$ data blocks may include a data block whose priority is the same as that of the UCI in the N data blocks. If there are a plurality of data blocks whose priority is the same as the priority of the UCI in the N data blocks, the plurality of data blocks are the $m_2$ data blocks, or some data blocks in the plurality of data blocks are the $m_2$ data blocks. Optionally, if there are a plurality of data blocks whose priority is the same as the priority of the UCI in the N data blocks, which data blocks in the plurality of data blocks are used as the $m_2$ data blocks may be determined in the following manner: ($m_2$) data blocks with highest time-frequency resource positions in the plurality of data blocks are used as the $m_2$ data blocks. In another implementation, the $m_2$ data blocks may be determined based on a quantity of bits corresponding to at least one data block in the N data blocks. For example, the $m_2$ data blocks includes a data block corresponding to a minimum quantity of bits in the N data blocks. If there are a plurality of data blocks corresponding to a minimum quantity of bits in the N data blocks, the plurality of data blocks (corresponding to a minimum quantity of bits) are the $m_2$ data blocks; or some data blocks in the plurality of data blocks (corresponding to a minimum quantity of bits) are the $m_2$ data blocks. Optionally, if there are a plurality of data blocks corresponding to a minimum quantity of bits in the N data blocks, which data blocks in the plurality of data blocks (corresponding to a minimum quantity of bits) are used as the $m_2$ data blocks may be determined in the following manner: ($m_2$) data blocks with highest time-frequency resource positions in the plurality of data blocks (corresponding to a minimum quantity of bits) are used as the $m_2$ data blocks.

The second manner of determining the value P: The value P may be determined based on a modulation scheme and/or a code rate corresponding to an $n_2^{th}$ data block, $1 \leq n_2 \leq N$, and $n_2$ is a positive integer. The $n_2^{th}$ data block belongs to the N data blocks. The value P may be determined based on the following formula:

$$\text{Value } P = \left\lceil \frac{(O+L) * \beta_{offset}^{uplink\ data\ channel}}{R * Q_m} \right\rceil, \tag{2}$$

R represents a code rate corresponding to the $n_2^{th}$ data block, and $Q_m$ represents a modulation order used in the modulation scheme corresponding to the $n_2^{th}$ data block. For definitions of O, L, and $\beta_{offset}^{uplinkdatachannel}$, refer to descriptions in the foregoing formula (1). Details are not described herein again.

In an implementation, the $n_2{}^{th}$ data block may be determined based on a priority of at least one data block in the N data blocks and a priority of the UCI. Optionally, a priority of the $n_2{}^{th}$ data block is the same as the priority of the UCI. If there is only one data block whose priority is the same as the priority of the UCI in the N data blocks, the data block is the $n_2{}^{th}$ data block. If there are a plurality of data blocks whose priority is the same as the priority of the UCI in the N data blocks, the $n_2{}^{th}$ data block may be a data block with a highest time-frequency resource position in the plurality of data blocks. For example, the N data blocks include a data block 1, a data block 2, and a data block 3, and priorities of the data block 1, the data block 2, and the data block 3 are respectively a low priority, a low priority, and a high priority. If the priority of the UCI is a high priority, the $n_2{}^{th}$ data block is the data block 3. If the priority of the UCI is a low priority, and a time-frequency resource position corresponding to the data block 2 is higher than that of the data block 1, the $n_2{}^{th}$ data block is the data block 2.

In an implementation, the $n_2{}^{th}$ data block may be determined based on spectral efficiency of at least one data block in the N data blocks. Optionally, the $n_2{}^{th}$ data block is a data block with lowest spectral efficiency in the N data blocks. If there is one data block with lowest spectral efficiency in the N data blocks, the data block is the $n_2{}^{th}$ data block. If there are a plurality of data blocks with lowest spectral efficiency in the N data blocks, the $n_2{}^{th}$ data block may be a data block with a highest time-frequency resource position in the plurality of data blocks with lowest spectral efficiency.

In an implementation, the $n_2{}^{th}$ data block may be determined based on an MCS corresponding to at least one data block in the N data blocks. For example, the $n_2{}^{th}$ data block is the first found data block whose MCS index is less than a preset value in the N data blocks. The preset value may be indicated by the network device or predefined. This is not limited in this embodiment of this application. Alternatively, in the N data blocks, an MCS index corresponding to the $n_2{}^{th}$ data block is the minimum. If there are a plurality of data blocks corresponding to a minimum MCS index in the N data blocks, the $n_2{}^{th}$ data block may be a data block with a highest time-frequency resource position in the plurality of data blocks corresponding to the minimum MCS index.

In an implementation, service data is carried on time-frequency resources corresponding to the N data blocks, and the value P may be determined in the foregoing first manner. That service data is carried on time-frequency resources corresponding to the N data blocks indicates that a part or all of the time-frequency resources corresponding to the N data blocks carry the service data. When the uplink data channel is a PUSCH, that service data is carried on time-frequency resources corresponding to the N data blocks may also be described as follows: There is a UL-SCH corresponding to the PUSCH. In an implementation, no service data is carried on time-frequency resources corresponding to the N data blocks, and the value P may be determined in the foregoing second manner. It may be understood that no service data being carried on time-frequency resources corresponding to the N data blocks indicates that no time-frequency resource corresponding to the N data blocks carries the service data. When the uplink data channel is a PUSCH, that no service data is carried on time-frequency resources corresponding to the N data blocks may also be described as follows: There is no UL-SCH corresponding to the PUSCH. Optionally, whether time-frequency resources corresponding to the N data blocks carry service data may be indicated by indication information 3, or whether there is a UL-SCH corresponding to the uplink data channel may be indicated by indication information 3. Optionally, the indication information 3 and the indication information 1 may be included in one piece of DCI.

In an implementation, if the uplink data channel carries N data blocks, and N is a positive integer greater than or equal to 2, it may be considered that there is a UL-SCH corresponding to the uplink data channel (or time-frequency resources corresponding to the N data blocks carry service data), so that the terminal device may determine the value P in the foregoing first manner.

In an implementation, the uplink data channel carries N data blocks, the N data blocks include a first data block and a second data block, N is a positive integer greater than or equal to 2, the first data block is modulated based on a first MCS, and the second data block is modulated based on a second MCS. If there is no UL-SCH corresponding to the uplink data channel (or time-frequency resources corresponding to the N data blocks do not carry service data), the first MCS is the same as the second MCS. When there is no UL-SCH corresponding to the uplink data channel (or time-frequency resources corresponding to the N data blocks do not carry service data), and the value P may be determined based on the foregoing formula (2). The first MCS being the same as the second MCS means that the first data block and the second data block correspond to a same code rate, and modulation orders used in corresponding modulation schemes are also the same. In this way, a value P calculated based on the formula (2) when the $n_2{}^{th}$ data block is the first data block is the same as a value P calculated based on the formula (2) when the $n_2{}^{th}$ data block is the second data block.

In an implementation, the value Q may be determined based on a quantity of resource elements occupied by an $n_3{}^{th}$ data block and/or a first parameter corresponding to the $n_3{}^{th}$ data block, $1 \le n_3 \le N$, $n_3$ is a positive integer, and the $n_3{}^{th}$ data block belongs to the N data blocks. The first parameter is for determining the value Q, to cause the value Q to be less than a sum of quantities of resource elements occupied by the N data blocks. In this embodiment of this application, the uplink data channel carries N data blocks, the N data blocks include a first data block and a second data block, and N is a positive integer greater than or equal to 2. A first parameter corresponding to the first data block is al, and a first parameter corresponding to the second data block is α2. α1 and α2 may be the same or may be different. In other words, each data block in the N data blocks may correspond to one first parameter, and first parameters corresponding to different data blocks may be the same or may be different. For example, the N data blocks include a data block 1, a data block 2, and a data block 3, first parameters corresponding to the data block 1 and the data block 2 are the same, that is, α3, and a first parameter corresponding to the data block 3 is α4. Optionally, the first parameter≥0. The first parameter may be indicated by DCI or higher layer signaling.

In an implementation, the value Q may be a product of a quantity of resource elements occupied by the $n_3{}^{th}$ data block and a first parameter corresponding to the $n_3{}^{th}$ data block. For example, the N data blocks include a first data block and a second data block, quantities of resource elements occupied by the first data block and the second data block are 70 REs and 30 REs respectively, and first parameters corresponding to the first data block and the second data block are 0.8 and 0.9 respectively. If the first data block is the $n_3{}^{th}$ datablock, the value Q=70 REs*0.8=56 REs. If the second data block is the $n_3{}^{th}$ data block, the value Q=30 REs*0.9=27 REs.

In this embodiment of this application, the first parameter is configured for the $n_3{}^{th}$ data block, so that when the UCI is transmitted through the uplink data channel, the UCI does not occupy all resources of the $n_3{}^{th}$ data block. Therefore, the $n_3{}^{th}$ data block can further carry service data in addition to carrying the UCI. If a manner (for example, referred to as a manner 1) of configuring the first parameter for the $n_3{}^{th}$ data block is not used, but a manner (for example, referred to as a manner 2) of configuring one parameter (for example, the parameter is a coefficient 1, and the coefficient 1≥0) for the uplink data channel is used, an upper limit of the quantity of resource elements that are on the uplink data channel and that are for transmitting the UCI may be the coefficient 1*the quantity of resource elements occupied by the uplink data channel. Determining the value Q according to the method may cause the upper limit of the quantity of resource elements that are on the uplink data channel and that are for transmitting the UCI to be greater than the quantity of resource elements occupied by each data block in the N data blocks. Further, the UCI may occupy all resources of a data block, and the data block cannot carry service data. For example, the quantity of resource elements occupied by the uplink data channel is 100 REs, the N data blocks include a first data block and a second data block, a quantity of resource elements occupied by the first data block is 70 REs, and a quantity of resource elements occupied by the second data block is 30 REs. If the manner 1 is used, the first parameter corresponding to the second data block is 0.8, and the second data block is the $n_3{}^{th}$ data block, the upper limit of the quantity of resource elements that are on the uplink data channel and that are for transmitting the UCI is: 30 REs*0.8=24 REs. If the manner 2 is used, and the coefficient 1 is 0.8, the upper limit of the quantity of resource elements that are on the uplink data channel and that are for transmitting the UCI is 100 REs*0.8=80 REs. Apparently, if the manner 1 is used, when the UCI is transmitted through the uplink data channel, the UCI neither occupies all resource elements of the second data block nor occupies a resource element of the first data block. If the manner 2 is used, the UCI may occupy all resource elements of the second data block, which prevents the second data block from carrying service data.

In an implementation, the $n_3{}^{th}$ data block may be determined based on a priority of at least one data block in the N data blocks and a priority of the UCI. For example, the priority of the $n_3{}^{th}$ data block is the same as the priority of the UCI. If there are a plurality of data blocks whose priority is the same as the priority of the UCI in the N data blocks, the $n_3{}^{th}$ data block may be a data block with a highest time-frequency resource position in the plurality of data blocks. In an implementation, the $n_3{}^{th}$ data block may be determined based on a quantity of bits corresponding to at least one data block in the N data blocks. For example, the $n_3{}^{th}$ data block is a data block corresponding to a minimum quantity of bits in the N data blocks. If there are a plurality of data blocks corresponding to a minimum quantity of bits in the N data blocks, the $n_3{}^{th}$ data block may be a data block with a highest time-frequency resource position in the plurality of data blocks corresponding to the minimum quantity of bits. In an implementation, the $n_3{}^{th}$ data block may be determined based on spectral efficiency of at least one data block in the N data blocks. For example, the $n_3{}^{th}$ data block is a data block with lowest spectral efficiency in the N data blocks. If there are a plurality of data blocks with lowest spectral efficiency in the N data blocks, the $n_3{}^{th}$ data block may be a data block with a highest time-frequency resource position in the plurality of data blocks with lowest spectral efficiency. In an implementation, the $n_3{}^{th}$ data block may be determined based on an MCS corresponding to at least one data block in the N data blocks. For example, the $n_3{}^{th}$ data block is a data block corresponding to a minimum MCS index in the N data blocks. If there are a plurality of data blocks corresponding to a minimum MCS index in the N data blocks, the $n_3{}^{th}$ data block may be a data block with a highest time-frequency resource position in the plurality of data blocks corresponding to the minimum MCS index.

In an implementation, the $n_3{}^{th}$ data block and the $n_2{}^{th}$ data block may be a same data block; or when $m_2=1$, the $n_3{}^{th}$ data block and the $m_2$ data blocks are a same data block. In other words, a data block (that is, the $n_2{}^{th}$ data block or the $m_2$ data blocks ($m_2=1$)) selected in the process of determining the value P is the same as a data block (that is, the $n_3{}^{th}$ data block) selected in the process of determining the value Q.

In an implementation, the first parameter (that is, the first parameter corresponding to the $n_3{}^{th}$ data block) may be determined by the network device based on a priority of the $n_3{}^{th}$ data block. Optionally, the uplink data channel carries N data blocks, and the N data blocks include a first data block and a second data block. If a priority of the first data block is different from a priority of the second data block, a first parameter corresponding to the first data block may be different from a first parameter corresponding to the second data block. In other words, different first parameters may be configured for data blocks with different priorities. Optionally, if a priority of the first data block is higher than a priority of the second data block, the first parameter corresponding to the first data block may be lower than the first parameter corresponding to the second data block. In other words, a higher priority of a data block indicates a smaller first parameter corresponding to the data block. In this way, for a data block with a higher priority, even if the UCI occupies resources of the data block when being transmitted through the uplink data channel, the UCI does not occupy too many resource elements of the data block. Therefore, during transmission of the UCI, service data carried on the data block with a higher priority can still be transmitted normally.

In another implementation, the first parameter may be determined by the network device based on spectral efficiency of the $n_3{}^{th}$ data block. Optionally, the uplink data channel carries N data blocks, and the N data blocks include a first data block and a second data block. If spectral efficiency of the first data block is different from spectral efficiency of the second data block, a first parameter corresponding to the first data block may be different from a first parameter corresponding to the second data block. In other words, different first parameters may be configured for data blocks with different spectral efficiency. Optionally, if spectral efficiency of the first data block is higher than spectral efficiency of the second data block, the first parameter corresponding to the first data block may be greater than the first parameter corresponding to the second data block. In other words, higher spectral efficiency of a data block indicates a larger first parameter corresponding to the data block. Higher spectral efficiency of a data block indicates a lower reliability requirement of the data block. A larger first parameter is configured for a data block with higher spectral efficiency, so that even if an error occurs during transmission of service data carried on the data block because the UCI occupies many resources of the data block when being transmitted through the uplink data channel, because the data block has a lower reliability requirement, quality of service of the service data on the data block can still meet a service requirement. Higher spectral efficiency of a data block indicates a larger first parameter corresponding to the data block. Through the method, even if the UCI occupies resources of a data block with lower spectral efficiency when being transmitted through the uplink data channel, the UCI does not occupy too many resource elements of the data block. Therefore, during transmission of the UCI, service data carried on the data block can still be normally transmitted.

In still another implementation, the first parameter may be determined by the network device based on a reliability-related parameter corresponding to the $n_3^{th}$ data block. The reliability-related parameter corresponding to the $n_3^{th}$ data block may indicate a reliability requirement of the $n_{3h}$ data block. For example, a larger value of the reliability-related parameter corresponding to the $n_3^{th}$ data block may indicate a higher reliability requirement of the $n_3^{th}$ data block, and a smaller value of the reliability-related parameter corresponding to the $n_3^{th}$ data block may indicate a lower reliability requirement of the $n_3^{th}$ data block. Optionally, the uplink data channel carries N data blocks, and the N data blocks include a first data block and a second data block. If a value of a reliability-related parameter corresponding to the first data block is different from a value of a reliability-related parameter corresponding to the second data block, a value of a first parameter corresponding to the first data block may be different from a value of a first parameter corresponding to the second data block. To be specific, different first parameters may be configured for data blocks whose reliability-related parameters have different values. Optionally, if the value of the reliability-related parameter corresponding to the first data block is greater than the value of the reliability-related parameter corresponding to the second data block, the value of the first parameter corresponding to the first data block may be less than the value of the first parameter corresponding to the second data block. To be specific, a larger value of a reliability-related parameter corresponding to a data block indicates a smaller value of a first parameter corresponding to the data block.

Optionally, the reliability-related parameter corresponding to the $n_3^{th}$ data block may be determined based on spectral efficiency of the $n_3^{th}$ data block. Higher spectral efficiency of a data block indicates a smaller value of a reliability-related parameter corresponding to the data block. Optionally, the reliability-related parameter corresponding to the $n_3^{th}$ data block may be determined based on a priority of the $n_3^{th}$ data block. A higher priority of a data block indicates a larger value of a reliability-related parameter corresponding to the data block.

If the UCI occupies too many resources, reliability of data transmission on the uplink data channel is degraded. In this embodiment of this application, a smaller first parameter is configured for a data block whose reliability-related parameter has a larger value, so that for a data block with a high reliability requirement, even if the UCI occupies resources of the data block when being transmitted through uplink data channel, not too many resources of the data block are occupied, to ensure reliability of service data carried on the data block during transmission of the UCI. It should be noted that service data with a high reliability requirement may be carried on a data block with a high reliability requirement, and service data with a low reliability requirement may be carried on a data block with a low reliability requirement. A larger first parameter is configured for a data block whose reliability-related parameter has a smaller value, so that even if an error occurs during transmission of service data carried on the data block because the UCI occupies many resources of the data block when being transmitted through the uplink data channel, because the data block has a lower reliability requirement, quality of service of the service data on the data block can still meet a service requirement.

In this embodiment of this application, the first parameter is configured for the $n_3^{th}$ data block, so that when the UCI is transmitted through the uplink data channel, the UCI does not occupy all resources of the $n_3^{th}$ data block. Therefore, the $n_3^{th}$ data block can further carry service data in addition to carrying the UCI.

Figure 5:
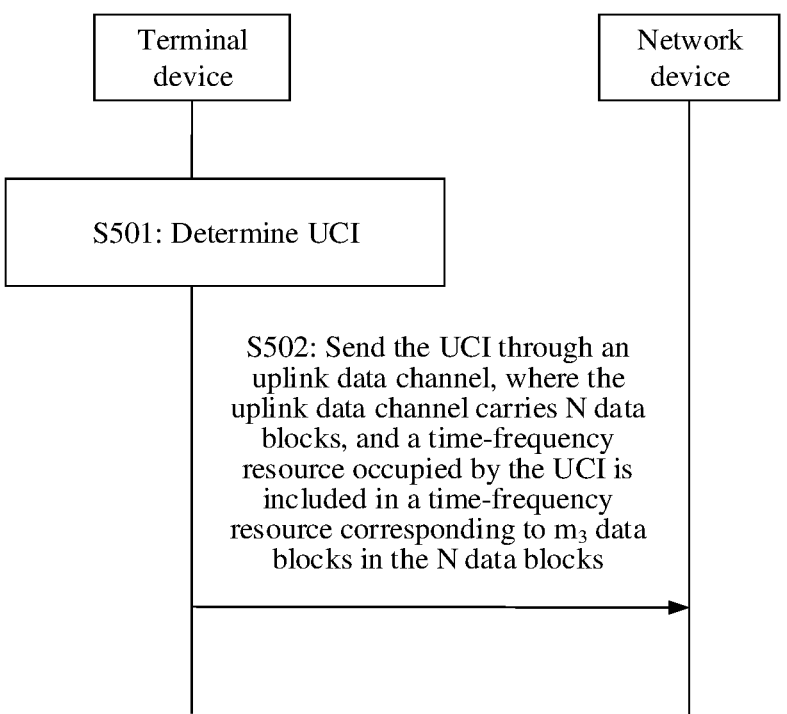
FIG. 5 is a schematic flowchart of still another information transmission method according to an embodiment of this application.

FIG. 5 is a schematic flowchart of still another information transmission method according to an embodiment of this application. In the method, a time-frequency resource of which data block or data blocks in N data blocks that UCI occupies if transmitting the UCI through an uplink data channel is allowed is described in detail. Descriptions are provided below by using an example in which the information transmission method is performed by a terminal device and a network device. The method may include, but is not limited to, the following steps.

Step S501: A terminal device determines UCI.

Step S502: The terminal device sends the UCI to a network device through an uplink data channel, where the uplink data channel carries N data blocks, the N data blocks include a first data block and a second data block, N is a positive integer greater than or equal to 2, the first data block is modulated based on a first MCS, and the second data block is modulated based on a second MCS; and a time-frequency resource occupied by the UCI is included in a time-frequency resource corresponding to $m_3$ data blocks in the N data blocks.

$1 \leq m_3 \leq N$, and $m_3$ is a positive integer. That a time-frequency resource occupied by the UCI is included in a time-frequency resource corresponding to $m_3$ data blocks in the N data blocks may indicate that the UCI occupies a part or all of the time-frequency resource corresponding to the $m_3$ data blocks. When $m_3=1$, the quantity of resource elements occupied by the UCI in the time-frequency resource corresponding to the $m_3$ data blocks is a smaller value between a value P and a value Q. For details, refer to descriptions in the embodiment of FIG. 4. When $m_3>1$, a sum of quantities of resource elements occupied by the UCI in the time-frequency resources corresponding to all data blocks in the $m_3$ data blocks is a smaller value between a value P and a value Q.

In an implementation, the $m_3$ data blocks may be determined in one or more of the following manners, but are not limited to:

Manner 1: The $m_3$ data blocks may be determined based on a priority of at least one data block in the N data blocks. Optionally, the $m_3$ data blocks may include a data block with a low priority in the N data blocks. If there are a plurality of data blocks whose priority is a low priority in the N data blocks, the plurality of data blocks are the $m_3$ data blocks, or some data blocks in the plurality of data blocks are the $m_3$ data blocks. In this case, priorities of all data blocks in the $m_3$ data blocks are a low priority. Optionally, if there are a plurality of data blocks whose priority is a low priority in the N data blocks, which data blocks in the plurality of data blocks are used as the $m_3$ data blocks may be determined in the following manner: ($m_3$) data blocks with highest time-frequency resource positions in the plurality of data blocks are used as the $m_3$ data blocks.

Optionally, the $m_3$ data blocks may further include a data block with a high priority in addition to the data blocks with a low priority in the N data blocks. To be specific, the $m_3$ data blocks include at least all data blocks with a low priority in the N data blocks. If the N data blocks include a data blocks with a low priority and b data blocks with a high priority, the UCI needs to occupy resources of c data blocks, and c>a, in addition to the a data blocks with a low priority, the $m_3$ data blocks further include (c-a) data blocks with a high priority. Optionally, the (c-a) data blocks with a high priority may be determined in the following manner: (c-a) data blocks with highest time-frequency resource positions in the b data blocks with a high priority are used as the (c-a) data blocks with a high priority. For example, the N data blocks include a data block 1, a data block 2, and a data block 3, and priorities of the data block 1, the data block 2, and the data block 3 are respectively a low priority, a high priority, and a high priority. It can be learned that the $m_3$ data blocks include at least a data block with a low priority in the N data blocks, and the $m_3$ data blocks include at least the data block 1. If the UCI needs to occupy resources of two data blocks, and a time-frequency resource position corresponding to the data block 3 is higher than that of the data block 2, the $m_3$ data blocks include the data block 1 and the data block 3.

In an implementation, the UCI occupies resources of a data block with a lower priority. Through this method, the UCI can be prevented from affecting transmission performance of a data block with a higher priority.

Manner 2: The $m_3$ data blocks may be determined based on a priority of at least one data block in the N data blocks and a priority of the UCI. For example, the $m_3$ data blocks may include a data block whose priority is the same as that of the UCI in the N data blocks. If there are a plurality of data blocks whose priority is the same as the priority of the UCI in the N data blocks, the plurality of data blocks are the $m_3$ data blocks, or some data blocks in the plurality of data blocks are the $m_3$ data blocks. Optionally, if there are a plurality of data blocks whose priority is the same as the priority of the UCI in the N data blocks, which data blocks in the plurality of data blocks are used as the $m_3$ data blocks may be determined in the following manner: ($m_3$) data blocks with highest time-frequency resource positions in the plurality of data blocks are used as the $m_3$ data blocks. In an implementation, the UCI occupies resources of a data block whose priority is the same as that of the UCI. Through this method, the UCI can be prevented from affecting transmission performance of a data block with a priority higher than that of the UCI.

Manner 3: The $m_3$ data blocks may be determined based on a reliability-related parameter corresponding to at least one data block in the N data blocks. Optionally, the $m_3$ data blocks may include a data block whose corresponding reliability-related parameter has a minimum value in the N data blocks. If there are a plurality of data blocks whose corresponding reliability-related parameter has a minimum value in the N data blocks, the plurality of data blocks (whose corresponding reliability-related parameter has a minimum value) are the $m_3$ data blocks; or some data blocks (for example, $m_3$ data blocks) in the plurality of data blocks (whose corresponding reliability-related parameter has a minimum value) are the $m_3$ data blocks. In this case, values of reliability-related parameters corresponding to all data blocks in the $m_3$ data blocks are the minimum. That there are a plurality of data blocks whose corresponding reliability-related parameter has a minimum value in the N data blocks indicates that: Reliability-related parameters corresponding to several data blocks in the N data blocks have a same value, and the value is a minimum value in values of reliability-related parameters corresponding to all data blocks in the N data blocks. Optionally, if there are a plurality of data blocks whose corresponding reliability-related parameter has a minimum value in the N data blocks, which data blocks in the plurality of data blocks (whose corresponding reliability-related parameter has a minimum value) are used as the $m_3$ data blocks may be determined in the following manner: ($m_3$) data blocks with highest time-frequency resource positions in the plurality of data blocks (whose corresponding reliability-related parameter has a minimum value) are used as the $m_3$ data blocks.

Optionally, the $m_3$ data blocks may further include another data block in addition to the data blocks whose corresponding reliability-related parameter has a minimum value in the N data blocks. To be specific, the $m_3$ data blocks include at least the data blocks whose corresponding reliability-related parameter has a minimum value in the N data blocks. If a quantity of the data blocks whose corresponding reliability-related parameter has a minimum value in the N data blocks is i, the UCI needs to occupy resources of j data blocks, and j>i, the $m_3$ data blocks further include (j−i) data blocks in addition to the i data blocks whose reliability-related parameter has a minimum value. Optionally, the (j−i) data blocks may be (j−i) data blocks with highest time-frequency resource positions in (N−i) data blocks other than the i data blocks whose reliability-related parameter has a minimum value in the N data blocks. For example, the N data blocks include a data block 1, a data block 2, and a data block 3, and a value of a reliability-related parameter corresponding to the data block 1<a value of a reliability-related parameter corresponding to the data block 2<a value of a reliability-related parameter corresponding to the data block 3. It can be learned from that the $m_3$ data blocks include at least a data block whose reliability-related parameter has a minimum value, that the $m_3$ data blocks include at least the data block 1. If the UCI needs to occupy resources of two data blocks, and a time-frequency resource position corresponding to the data block 3 is higher than that of the data block 2, the $m_3$ data blocks include the data block 1 and the data block 3. In an implementation, the UCI occupies resources of a data block with a low reliability requirement. In this manner, the UCI can be prevented from affecting transmission performance of a data block with a higher reliability requirement.

Manner 4: The $m_3$ data blocks may be determined based on spectral efficiency of at least one data block in the N data blocks. For example, the $m_3$ data blocks may include a data block with highest spectral efficiency in the N data blocks. If there are a plurality of data blocks with highest spectral efficiency in the N data blocks, the plurality of data blocks (with highest spectral efficiency) are the $m_3$ data blocks; or some data blocks (for example, $m_3$ data blocks) in the plurality of data blocks (with highest spectral efficiency) are the $m_3$ data blocks. In this case, spectral efficiency of all data blocks in the $m_3$ data blocks is the highest. Optionally, if there are a plurality of data blocks with highest spectral efficiency in the N data blocks, which data blocks in the plurality of data blocks (with highest spectral efficiency) are used as the $m_3$ data blocks may be determined in the following manner: ($m_3$) data blocks with highest time-frequency resource positions in the plurality of data blocks (with highest spectral efficiency) are used as the $m_3$ data blocks. Optionally, the $m_3$ data blocks may further include another data block in addition to the data blocks with highest spectral efficiency in the N data blocks. To be specific, the $m_3$ data blocks include at least the data blocks with highest spectral efficiency in the N data blocks. If a quantity of the data blocks with highest spectral efficiency in the N data blocks is x, the UCI needs to occupy resources of y data blocks, and y>x, in addition to the x data blocks with highest spectral efficiency, the $m_3$ data blocks further include (y-x) data blocks. Optionally, the (y-x) data blocks may be (y-x) data blocks with highest time-frequency resource positions in (N-x) data blocks other than the x data blocks with highest spectral efficiency in the N data blocks. For example, the N data blocks include a data block 1, a data block 2, and a data block 3, and spectral efficiency of the data block 1<spectral efficiency of the data block 2<spectral efficiency of the data block 3. If the UCI needs to occupy resources of two data blocks, and a time-frequency resource position corresponding to the data block 3 is higher than that of the data block 2, the $m_3$ data blocks may include the data block 1 and the data block 3. Alternatively, the first $m_3$ data blocks with highest spectral efficiency in the N data blocks may be used as the $m_3$ data blocks. For example, in the N data blocks, ($m_3$) data blocks are sequentially selected in descending order of spectral efficiency. For example, the N data blocks include a data block 1, a data block 2, and a data block 3, and spectral efficiency of the data block 1<spectral efficiency of the data block 2<spectral efficiency of the data block 3. If the UCI needs to occupy resources of two data blocks ($m_3$=2), the $m_3$ data blocks may include a data block 2 and a data block 3. In this embodiment of this application, a data block with higher spectral efficiency has a lower reliability requirement. In an implementation, the UCI occupies resources of a data block with higher spectral efficiency. In this manner, the UCI can be prevented from affecting transmission performance of a data block with a higher reliability requirement.

Manner 5: The $m_3$ data blocks may be determined based on an MCS corresponding to at least one data block in the N data blocks. For example, the $m_3$ data blocks may include a data block corresponding to a maximum MCS index in the N data blocks. If there are a plurality of data blocks corresponding to a maximum MCS index in the N data blocks, the plurality of data blocks (with a maximum MCS index) are the $m_3$ data blocks; or some data blocks (for example, $m_3$ data blocks) in the plurality of data blocks (with a maximum MCS index) are the $m_3$ data blocks. Optionally, if there are a plurality of data blocks corresponding to a maximum MCS index in the N data blocks, which data blocks in the plurality of data blocks (with a maximum MCS index) are used as the $m_3$ data blocks may be determined in the following manner: ($m_3$) data blocks with highest time-frequency resource positions in the plurality of data blocks (with a maximum MCS index) are used as the $m_3$ data blocks. Alternatively, first $m_3$ data blocks corresponding to a maximum MCS index in the N data blocks may be used as the $m_3$ data blocks. For example, in the N data blocks, ($m_3$) data blocks are sequentially selected in descending order of MCS index. In this embodiment of this application, a data block with a larger MCS index has a lower reliability requirement. In an implementation, the UCI occupies resources of a data block with a larger MCS index. In this manner, the UCI can be prevented from affecting transmission performance of a data block with a higher reliability requirement.

Manner 6: The $m_3$ data blocks may be determined based on a latency-related parameter corresponding to at least one data block in the N data blocks. A latency-related parameter corresponding to a data block may indicate a latency requirement of the data block. A larger value of a latency-related parameter corresponding to a data block may indicate a higher latency requirement of the data block. A smaller value of the latency-related parameter corresponding to the data block may indicate a lower latency requirement of the data block. In this embodiment of this application, the $m_3$ data blocks may include a data block whose corresponding latency-related parameter has a minimum value in the N data blocks. If there are a plurality of data blocks whose corresponding latency-related parameter has a minimum value in the N data blocks, the plurality of data blocks (whose corresponding latency-related parameter has a minimum value) are the $m_3$ data blocks; or some data blocks (for example, $m_3$ data blocks) in the plurality of data blocks (whose corresponding latency-related parameter has a minimum value) are the $m_3$ data blocks. That there are a plurality of data blocks whose corresponding latency-related parameter has a minimum value in the N data blocks indicates that: Latency-related parameters corresponding to several data blocks in the N data blocks have a same value, and the value is a minimum value in values of latency-related parameters corresponding to all data blocks in the N data blocks. Optionally, if there are a plurality of data blocks whose latency-related parameter has a minimum value in the N data blocks, which data blocks in the plurality of data blocks (whose latency-related parameter has a minimum value) are used as the $m_3$ data blocks may be determined based on one or more of priorities, reliability-related parameters, spectral efficiency, or MCS indexes of the data blocks. For example, in the plurality of data blocks (whose latency-related parameter has a minimum value), first ($m_3$) data blocks with a lowest priority are used as the $m_3$ data blocks, or first ($m_3$) data blocks whose reliability-related parameter has a minimum value are used as the $m_3$ data blocks, or first ($m_3$) data blocks with the highest spectral efficiency are used as the $m_3$ data blocks, or first ($m_3$) data blocks with the maximum MCS index are used as the $m_3$ data blocks. In an implementation, the UCI occupies resources of a data block with a lower latency requirement in N data blocks. In this manner, the UCI can be prevented from affecting transmission performance of a data block with a higher latency requirement.

The latency-related parameter corresponding to the data block may be determined in the following manner: For example, N data blocks include a first data block and a second data block. If a symbol index of a $1^{st}$ symbol of a time-frequency resource corresponding to the first data block is smaller than a symbol index of a $1^{st}$ symbol of a time-frequency resource corresponding to the second data block, a value of a latency-related parameter corresponding to the first data block may be greater than a value of a latency-related parameter corresponding to the second data block. Alternatively, if a symbol index of a last symbol of a time-frequency resource corresponding to the first data block is smaller than a symbol index of a last symbol of a time-frequency resource corresponding to the second data block, a value of a latency-related parameter corresponding to the first data block may be greater than a value of a latency-related parameter corresponding to the second data block. Alternatively, a higher priority of a data block indicates a larger value of a latency-related parameter corresponding to the data block.

In another implementation, the $m_3$ data blocks may be further determined in the following manner: The terminal device receives indication information from the network device. The indication information indicates the $m_3$ data blocks. For example, the indication information includes identifiers of all data blocks in the $m_3$ data blocks. The indication information may be DCI or higher layer signaling.

In an implementation, the indication information may further indicate a quantity of resource elements occupied by the UCI in each of the $m_3$ data blocks. Optionally, the indication information may indicate an N-item continued ratio, items in the N-item continued ratio are in a one-to-one correspondence with the N data blocks, and each item in the N-item continued ratio indicates a quantity of resource elements occupied by the UCI in a data block corresponding to the item. For example, N=3, the uplink data channel carries a data block 1, a data block 2, and a data block 3, and a three-item continued ratio indicated by the indication information is 1:0:2. 1:0:2 represents a ratio between a quantity of resource elements occupied by the UCI in the data block 1, a quantity of resource elements occupied by the UCI in the data block 2, and a quantity of resource elements occupied by the UCI in the data block 3. It can be learned from the three-item continued ratio that the UCI occupies resources of the data block 1 and the data block 3, and does not occupy resources of the data block 2. To be specific, the $m_3$ data blocks include the data block 1 and the data block 3. Further, it can be learned from the three-item continued ratio that, if a quantity of resource elements that are on the uplink data channel and that are for transmitting the UCI is X, a quantity of resource elements occupied by the UCI in the data block 1 is floor(X/3), and a quantity of resource elements occupied by the UCI in the data block 3 is X-floor(X/3). Alternatively, a quantity of resource elements occupied by the UCI in the data block 1 is ceil(X/3), and a quantity of resource elements occupied by the UCI in the data block 3 is X-ceil(X/3). floor(x) indicates rounding down to the nearest integer, to be specific, obtaining a maximum integer that is not greater than x, for example, floor(1.5)=1. ceil(x) indicates rounding up to the nearest integer, to be specific, obtaining a minimum integer not less than x, for example, ceil(1.5)=2. For example, X=10 REs, a quantity of resource elements occupied by the UCI in the data block 1 is floor(X/3)=3 REs, and a quantity of resource elements occupied by the UCI in the data block 3 is X-floor(X/3)=10 REs-3 REs=7 REs.

A continued ratio refers to a ratio between shares occupied by items in more than two items, and an N-item continued ratio refers to a ratio between shares occupied by items in N items. In the foregoing example, the three-item continued ratio is 1:0:2, indicating that a ratio of a quantity of resource elements occupied by the UCI in the data block 1 to a quantity of resource elements that are on the uplink data channel and that are for transmitting the UCI is 1/3, a ratio of a quantity of resource elements occupied by the UCI in the data block 2 to a quantity of resource elements that are on the uplink data channel and that are for transmitting the UCI is 0, and a portion of a quantity of resource elements occupied by the UCI in the data block 3 to a quantity of resource elements that are on the uplink data channel and that are for transmitting the UCI is 2/3.

It should be noted that, when N=2, the indication information may indicate a ratio, the ratio may indicate a quantity of resource elements occupied by the UCI in a data block (for example, referred to as a third data block) in the N data blocks, and a quantity of resource elements occupied by the UCI in another data block other than the third data block in the N data blocks is: a difference between a quantity of resource elements that are on the uplink data channel and that are for transmitting the UCI and a quantity of resource elements occupied by the UCI in the third data block. For example, N=2, the N data blocks include a data block 1 and a data block 2, a quantity of resource elements that are on the uplink data channel and that are for transmitting the UCI is 10 REs, and the third data block is the data block 1. The ratio being 1 may indicate that the UCI occupies only resource elements of the data block 1, and 10 REs in the data block 1 are occupied by the UCI. The ratio being 0.5 may indicate that: A quantity of resource elements occupied by the UCI in the data block 1 is 10 REs*0.5=5 REs, and a quantity of resource elements occupied by the UCI in the data block 2 is 10 REs-5 REs=5 REs. The third data block may be a data block with a highest time-frequency resource position in the N data blocks carried on the uplink data channel, or the third data block may be indicated by the network device or predefined.

In an implementation, when transmitting the UCI through the uplink data channel, the terminal device may preferentially ensure transmission of a data block with a higher priority, a larger value of a reliability-related parameter, lower spectral efficiency, a smaller MCS index, or a larger value of a latency-related parameter. In other words, the remaining resources other than the resources occupied by the UCI in the resources occupied by the uplink data channel may be preferentially for transmitting a data block with a higher priority, a larger value of a reliability-related parameter, lower spectral efficiency, a smaller MCS index, or a larger value of a latency-related parameter. For example, the uplink data channel carries a first data block and a second data block, a quantity of resource elements occupied by the uplink data channel is 100 REs, and the first data block and the second data block respectively occupy 70 REs and 30 REs. When the UCI is transmitted through the uplink data channel, 10 REs actually need to be occupied, and resources of the first data block are actually occupied (that is, the foregoing $m_3$ data blocks are the first data block). In this case, other than the 10 REs occupied by the UCI, the remaining 90 REs in the 100 REs can be for transmitting a data block. If a priority of the first data block is higher than a priority of the second data block, 70 REs in 90 REs may be preferentially allocated for transmitting the first data block with a higher priority, and the remaining 20 REs can be for transmitting the second data block with a lower priority.

In this embodiment of this application, the UCI occupies resources of the $m_3$ data blocks, so that the UCI can be prevented from affecting transmission performance of a data block with a higher priority, the UCI can be prevented from affecting transmission performance of a data block with a higher reliability requirement, or the UCI can be prevented from affecting affect transmission performance of a data block with a higher latency requirement.

The foregoing embodiments describe how to determine whether transmitting the UCI through the uplink data channel is allowed when the uplink data channel carries two or more data blocks (referring to the embodiment shown in FIG. 2 and the embodiment shown in FIG. 3), and how to determine a quantity of resource elements that are on the uplink data channel and that are for transmitting the UCI (referring to the embodiment shown in FIG. 4) if transmitting the UCI through the uplink data channel is allowed, and time-frequency resources of which data block or data blocks in the N data blocks that the UCI specifically occupies (referring to the embodiment shown in FIG. 5).

It should be noted that, in the embodiments shown in FIG. 2 and FIG. 3, how to determine whether transmitting the UCI through the uplink data channel is allowed is also applicable to a case in which the uplink data channel carries one data block. In the embodiment shown in FIG. 4, how to determine a quantity of resource elements that are on the uplink data channel and that are for transmitting the UCI is also applicable to a case in which the uplink data channel carries one data block.

Figure 6:
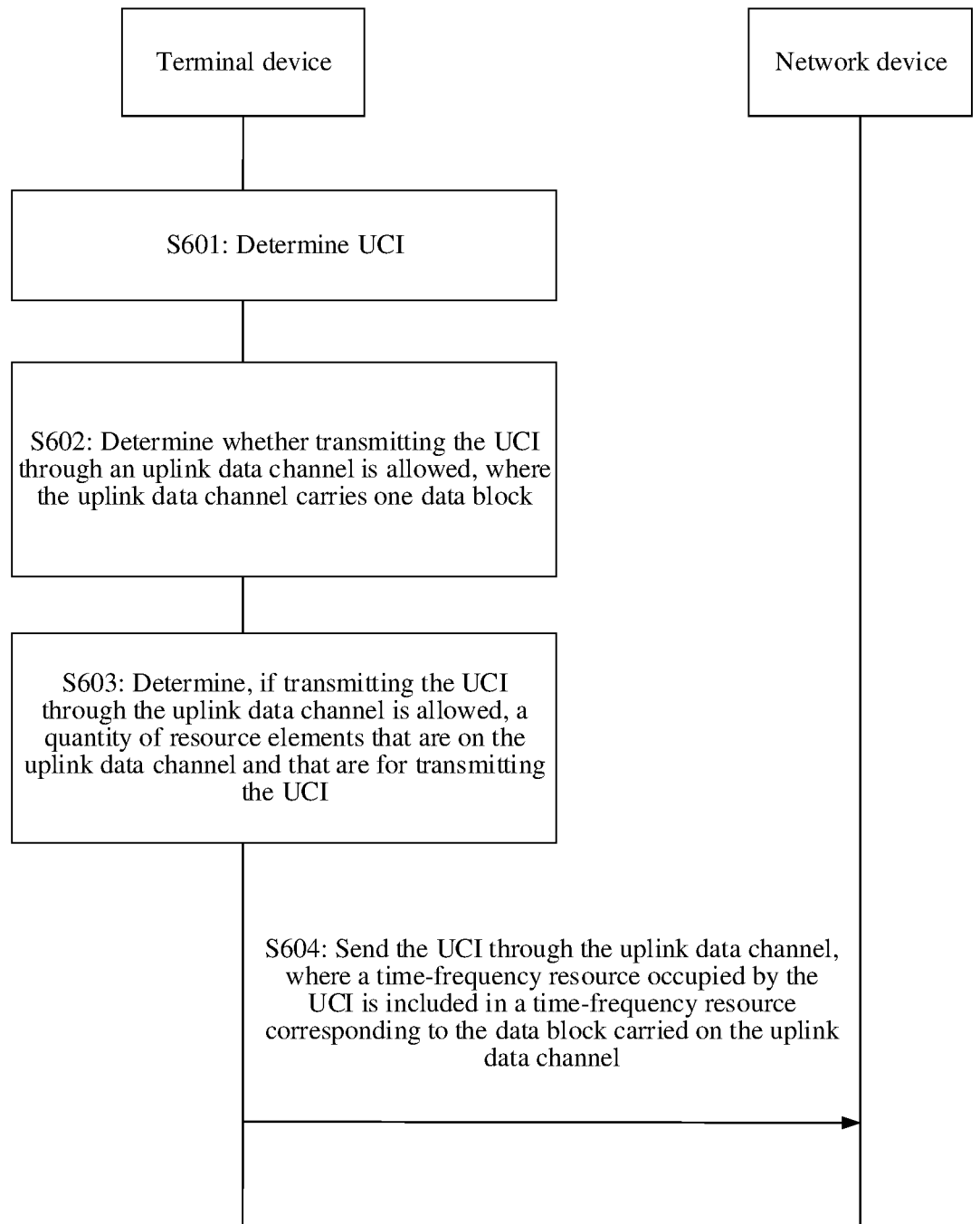
FIG. 6 is a schematic flowchart of still another information transmission method according to an embodiment of this application.

FIG. 6 is a schematic flowchart of still another information transmission method according to an embodiment of this application. In the method, how to determine whether transmitting UCI through an uplink data channel is allowed when the uplink data channel carries one data block, and how to determine a quantity of resource elements that are on the uplink data channel and that are for transmitting the UCI are described in detail. Descriptions are provided below by using an example in which the information transmission method is performed by a terminal device and a network device. The method may include, but is not limited to, the following steps.

Step S601: A terminal device determines UCI.

It should be noted that, for an execution process of step S601, refer to detailed descriptions of step S201 in FIG. 2. Details are not described herein again.

Step S602: The terminal device determines whether transmitting the UCI through an uplink data channel is allowed, where the uplink data channel carries one data block.

The terminal device sends the UCI to the network device through the uplink data channel, to prevent the UCI from being discarded, which helps ensure reliability of downlink data transmission.

Optionally, the time-frequency resource of the uplink data channel overlaps the time-frequency resource of the UCI.

In an implementation, the terminal device may determine, based on a quantity of bits corresponding to a data block carried on the uplink data channel and a quantity of bits occupied by the UCI, whether transmitting the UCI through the uplink data channel is allowed. For example, if a product of the quantity of bits corresponding to the data block carried on the uplink data channel and a coefficient A is greater than the quantity of bits occupied by the UCI, transmitting the UCI through the uplink data channel may be allowed. If the product of the quantity of bits corresponding to the data block carried on the uplink data channel and a coefficient A is greater than the quantity of bits occupied by the UCI, it indicates that the UCI occupies fewer bits. In this case, even if the UCI is transmitted through the uplink data channel, the UCI does not occupy too many resources of the uplink data channel, which helps ensure normal transmission of service data carried on the uplink data channel during transmission of the UCI.

In another implementation, the terminal device may determine, based on spectral efficiency of the UCI and spectral efficiency of a data block carried on the uplink data channel, whether transmitting the UCI through the uplink data channel is allowed. For example, if spectral efficiency of the UCI is higher than spectral efficiency of the data block, transmitting the UCI through the uplink data channel may be allowed. That spectral efficiency of the UCI is higher than spectral efficiency of the data block indicates that: The reliability requirement of the UCI is lower than the reliability requirement of the data block. In this way, when the UCI is transmitted through the uplink data channel, reliability of the UCI can be better ensured.

In still another implementation, the terminal device may determine, based on a priority of the UCI and a priority of the uplink data channel, whether transmitting the UCI through the uplink data channel is allowed. For example, if the priority of the UCI is the same as the priority of the uplink data channel, transmitting the UCI through the uplink data channel may be allowed.

It should be noted that, for an execution process of step S602, refer to detailed descriptions in the embodiment of FIG. 3. Details are not described herein again.

Step S603: The terminal device determines, if transmitting the UCI through the uplink data channel is allowed, a quantity of resource elements that are on the uplink data channel and that are for transmitting the UCI.

In an implementation, the terminal device may determine a smaller value between a value P' and a value Q' as a quantity of resource elements that are on the uplink data channel and that are for transmitting the UCI. The value P' is as a quantity of resource elements occupied by the UCI, and the value Q' is an upper limit of a quantity of resource elements that on the uplink data channel and that are for transmitting the UCI. In other words, the value Q' is for limiting a quantity of resource elements that the UCI occupies on the uplink data channel. The value P' and the value Q' are respectively integers greater than or equal to 1.

Optionally, the value P' may be determined based on the following formula:

$$\text{Value } P' = \left\lceil \frac{(O+L) * \beta_{offset}^{uplink\ data\ channel} * E}{F'} \right\rceil, \tag{3}$$

where

F' represents a quantity of bits corresponding to a data block carried on the uplink data channel. For definitions of other parameters, refer to descriptions in the foregoing formula (1). Details are not described herein again. Optionally, service data is carried on a time-frequency resource corresponding to the data block carried on the uplink data channel, and the value P' may be determined based on the formula (3).

Optionally, the value P' may be determined based on the following formula:

$$\text{Value } P' = \left\lceil \frac{(O+L) * \beta_{offset}^{uplink\ data\ channel}}{R * Q_m} \right\rceil, \tag{4}$$

where

R represents a code rate corresponding to the data block carried on the uplink data channel, and $Q_m$ represents a modulation order used in the modulation scheme corresponding to the data block. For definitions of other parameters, refer to descriptions in the foregoing formula (2). Details are not described herein again. Optionally, service data is carried on a time-frequency resource corresponding to the data block carried on the uplink data channel, and the value P' may be determined based on the formula (4).

In an implementation, the value Q' is a product of a quantity of all REs that are on the uplink data channel and that can be for transmitting the UCI resource and α'. To be specific, the value Q'=⌈α'*E⌉, where α' is for determining the value Q', to cause the value Q' to be less than a quantity of resource elements occupied by the uplink data channel, and α'≥0. α' may be indicated by DCI or higher layer signaling.

It should be noted that, for an execution process of step S603, refer to detailed descriptions in the embodiment of FIG. 4. Details are not described herein again.

Step S604: The terminal device sends the UCI to a network device through the uplink data channel, where a time-frequency resource occupied by the UCI is included in a time-frequency resource corresponding to the data block carried on the uplink data channel.

A quantity of resource elements occupied by the UCI in the data block is a smaller value between the value P' and the value Q'.

In this embodiment of this application, the UCI is transmitted through the uplink data channel, which helps ensure reliability of downlink data transmission. When a product of the quantity of bits corresponding to the data block carried on the uplink data channel and A is greater than the quantity of bits occupied by the UCI, transmitting the UCI through the uplink data channel may be allowed. In this manner, even if the UCI is transmitted through the uplink data channel, the UCI does not occupy too many resources of the uplink data channel, which helps ensure normal transmission of service data carried on the uplink data channel during transmission of the UCI.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figure 7:
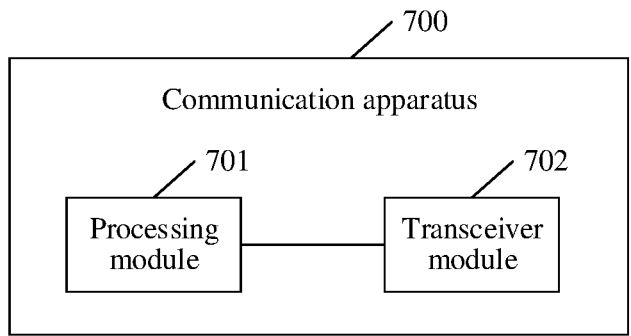
FIG. 7 is a schematic diagram of a structure of a communication apparatus according to an embodiment of this application.

FIG. 7 is a schematic diagram of a structure of a communication apparatus according to this application. A communication apparatus 700 shown in FIG. 7 includes a processing module 701 and a transceiver module 702.

In a design, the apparatus 700 is a terminal device, and is configured to implement functions of the terminal device in the embodiments shown in FIG. 2 to FIG. 5.

For example, the processing module 701 is configured to determine uplink control information UCI. The transceiver module 702 is configured to send the UCI to a network device through an uplink data channel. The uplink data channel carries N data blocks. The N data blocks include a first data block and a second data block. N is a positive integer greater than or equal to 2. The first data block is modulated based on a first modulation and coding scheme MCS. The second data block is modulated based on a second MCS.

In a design, the apparatus 700 is a network device, and is configured to implement functions of the network device in the embodiments shown in FIG. 2 to FIG. 5.

For example, the transceiver module 702 is configured to receive an uplink data channel from a terminal device. The uplink data channel carries N data blocks. The N data blocks include a first data block and a second data block. N is a positive integer greater than or equal to 2. The first data block is modulated based on a first modulation and coding scheme MCS, and the second data block is modulated based on a second MCS. The processing module 701 is configured to obtain uplink control information UCI from the uplink data channel.

In a design, the apparatus 700 is a terminal device, and is configured to implement functions of the terminal device in the embodiment shown in FIG. 6.

For example, the processing module 701 is configured to determine UCI, determine whether transmitting the UCI through an uplink data channel is allowed, and determine, if transmitting the UCI through the uplink data channel is allowed, a quantity of resource elements that are on the uplink data channel and that are for transmitting the UCI. The uplink data channel carries one data block. The transceiver module 702 is configured to send the UCI to a network device through the uplink data channel. A time-frequency resource occupied by the UCI is included in a time-frequency resource corresponding to the data block carried on the uplink data channel.

Figure 8:
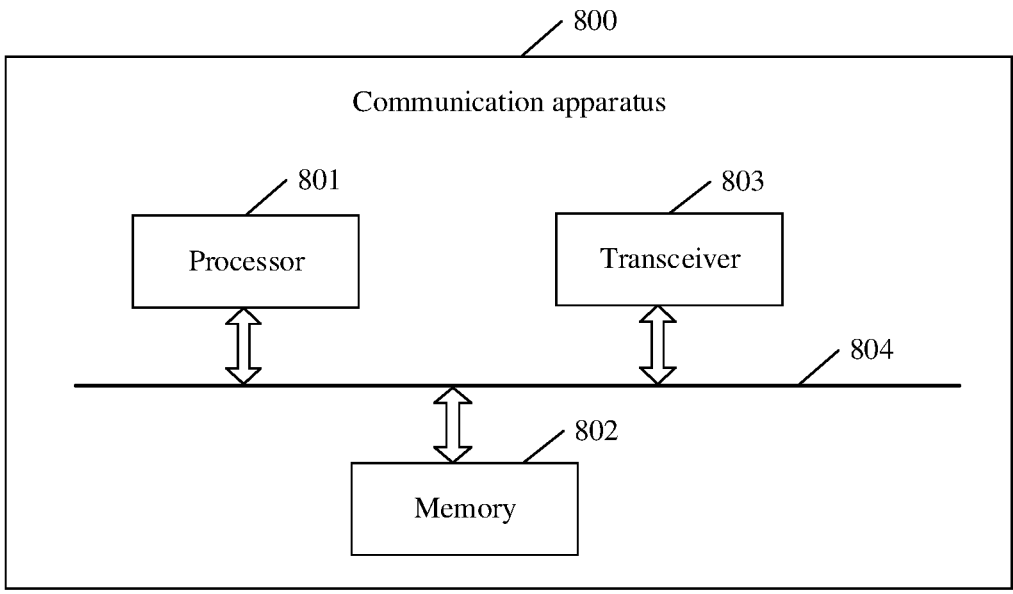
FIG. 8 is a schematic diagram of a structure of another communication apparatus according to an embodiment of this application.

FIG. 8 is a schematic diagram of a structure of another communication apparatus according to this application. A communication apparatus 800 shown in FIG. 8 includes at least one processor 801 and a memory 802, and optionally, may further include a transceiver 803. In this embodiment of this application, a specific connection medium between the processor 801 and the memory 802 is not limited. In this embodiment of this application, the memory 802 and the processor 801 are connected by using a bus 804 in the figure, the bus 804 is represented by a thick line in the figure, and a connection manner of other components is merely used for schematic description and is not limited thereto. The bus 804 may be classified into an address bus, a data bus, a control bus, and the like. For ease of representation, only one thick line is for representing the bus in FIG. 8, but this does not mean that there is only one bus or only one type of bus.

The processor 801 may have a data transceiver function, and can communicate with another device. In the apparatus shown in FIG. 8, an independent data transceiver module, for example, the transceiver 803, may further be arranged and configured to receive and send data. When communicating with the another device, the processor 801 may transmit data through the transceiver 803.

In an example, when a terminal device is in the form shown in FIG. 8, the processor 801 in FIG. 8 may invoke computer-executable instructions stored in the memory 802, to enable the terminal device to perform the method performed by the terminal device in any one of the embodiments of FIG. 2 to FIG. 5.

In an example, when a network device is in the form shown in FIG. 8, the processor 801 in FIG. 8 may invoke computer-executable instructions stored in the memory 802, to enable the network device to perform the method performed by the network device in any one of the embodiments of FIG. 2 to FIG. 5.

In an example, when a terminal device is in the form shown in FIG. 8, the processor 801 in FIG. 8 may invoke computer-executable instructions stored in the memory 802, to enable the terminal device to perform the method performed by the terminal device in the embodiment of FIG. 6.

Specifically, functions/implementation processes of the processing module and the transceiver module in FIG. 7 may be implemented by the processor 801 in FIG. 8 by invoking computer-executable instructions stored in the memory 802. Alternatively, a function/implementation process of the processing module in FIG. 7 may be implemented by the processor 801 in FIG. 8 by invoking computer-executable instructions stored in the memory 802, and a function/implementation process of the transceiver module in FIG. 7 may be implemented by the transceiver 803 in FIG. 8.

The solutions described in this application may be implemented in various manners. For example, the technologies may be implemented by hardware, software, or a combination thereof. For hardware implementation, a processing module configured to execute the technologies at a communication apparatus (for example, a base station, a terminal, a network entity, a core network element, or a chip) may be implemented in one or more general-purpose processors, digital signal processors (digital signal processors, DSPs), digital signal processor components, application-specific integrated circuits (application-specific integrated circuits, ASICs), programmable logic devices, field programmable gate arrays (field programmable gate arrays, FPGAs), or other programmable logic apparatuses, discrete gates or transistor logic devices, discrete hardware components, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps (steps) that are listed in embodiments of this application may be implemented by electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the scope of embodiments of this application.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments by using any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

"Predefine" in this application may be understood as "define", "predefine", "store", "pre-store", "pre-negotiate", "pre-configure", "solidify", or "pre-burn".

A person of ordinary skill in the art may understand that, for the purpose of convenient and brief description, for a detailed working process of the foregoing system, apparatuses, and units, refer to a corresponding process in the foregoing method embodiments. Details are not described herein again.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An information transmission method, comprising:
determining uplink control information (UCI); and
sending the UCI to a network device through an uplink data channel, wherein the uplink data channel carries N data blocks, the N data blocks comprise a first data block and a second data block, N is a positive integer greater than or equal to 2, the first data block is modulated based on a first modulation and coding scheme (MCS), and the second data block is modulated based on a second MCS, wherein the method further comprises determining a smaller value between a value P and a value Q as a quantity of resource elements that are on the uplink data channel and that are for transmitting the UCI, the value P is a quantity of resource elements occupied by the UCI, the value Q is an upper limit of the quantity of resource elements that are on the uplink data channel and that are for transmitting the UCI, and the values P and Q are respectively integers greater than or equal to 1, and either the value P is determined based on a quantity of bits corresponding to at least one data block in the N data blocks, or the value P is determined based on a modulation scheme or a code rate corresponding to an $n_2$th data block in the N data blocks, where $1 \leq n_2 \leq N$, and $n_2$ is a positive integer.

2. The method according to claim 1, wherein time-frequency resources occupied by any two data blocks in the N data blocks partially overlap each other or do not overlap each other at all.

3. The method according to claim 1, wherein the UCI does not comprise channel state information (CSI).

4. The method according to claim 1, wherein a quantity of bits occupied by the UCI is less than A*B, where $A \geq 0$, B is a quantity of bits corresponding to $m_1$ data blocks in the N data blocks, $1 \leq m_1 \leq N$, and $m_1$ is a positive integer, wherein
the $m_1$ data blocks are determined based on a quantity of bits corresponding to at least one data block in the N data blocks; or the $m_1$ data blocks are determined based on a priority of at least one data block in the N data blocks.

5. The method according to claim 1, wherein spectral efficiency of the UCI is higher than spectral efficiency of an $n_1^{th}$ data block in the N data blocks, where $1 \leq n_1 \leq N$, and $n_1$ is a positive integer, wherein
the $n_1^{th}$ data block is determined based on spectral efficiency of at least one data block in the N data blocks; or the $n_1^{th}$ data block is determined based on an MCS corresponding to at least one data block in the N data blocks; or the $n_1^{th}$ data block is determined based on a priority of at least one data block in the N data blocks and a priority of the UCI; or the $n_1^{th}$ data block is determined based on a quantity of bits corresponding to at least one data block in the N data blocks.

6. The method according to claim 1, wherein
a priority of the UCI is the same as a priority of the uplink data channel; or a priority of the UCI is the same as a priority of at least one data block in the N data blocks.

7. The method according to claim 1, wherein a time-frequency resource occupied by the UCI is comprised in a time-frequency resource corresponding to $m_3$ data blocks in the N data blocks, where $1 \leq m_3 \leq N$, and $m_3$ is a positive integer, wherein
the $m_3$ data blocks are determined based on a priority of at least one data block in the N data blocks; or the $m_3$ data blocks are determined based on a priority of at least one data block in the N data blocks and a priority of the UCI; or the $m_3$ data blocks are determined based on a reliability-related parameter corresponding to at least one data block in the N data blocks; or the $m_3$ data blocks are determined based on spectral efficiency of at least one data block in the N data blocks; or the $m_3$ data blocks are determined based on an MCS corresponding to at least one data block in the N data blocks; or the $m_3$ data blocks are determined based on a latency-related parameter corresponding to at least one data block in the N data blocks.

8. The method according to claim 1, wherein a quantity of bits occupied by the UCI is less than A*B, where $A \geq 0$, B is a quantity of bits corresponding to $m_1$ data blocks in the N data blocks, $1 \leq m_1 \leq N$, and $m_1$ is a positive integer, wherein
the $m_1$ data blocks are determined based on a priority of at least one data block in the N data blocks.

9. The method according to claim 1, wherein a time-frequency resource occupied by the UCI is comprised in a time-frequency resource corresponding to $m_3$ data blocks in the N data blocks, where $1 \leq m_3 < N$, and $m_3$ is a positive integer, wherein
the $m_3$ data blocks are determined based on a priority of at least one data block in the N data blocks; or the $m_3$ data blocks are determined based on a priority of at least one data block in the N data blocks and a priority of the UCI; or the $m_3$ data blocks are determined based on a reliability-related parameter corresponding to at least one data block in the N data blocks; or the $m_3$ data blocks are determined based on an MCS corresponding to at least one data block in the N data blocks; or the $m_3$ data blocks are determined based on a latency-related parameter corresponding to at least one data block in the N data blocks.

10. A communication apparatus, comprising:

at least one memory; and at least one processor configured to execute program instructions stored in the at least one memory to enable the apparatus to perform operations comprising:

determining uplink control information (UCI); and sending the UCI to a network device through an uplink data channel, wherein the uplink data channel carries N data blocks, the N data blocks comprise a first data block and a second data block, N is a positive integer greater than or equal to 2, the first data block is modulated based on a first modulation and coding scheme (MCS), and the second data block is modulated based on a second MCS, wherein spectral efficiency of the UCI is higher than spectral efficiency of an $n_1^{th}$ data block in the N data blocks, where $1 \leq n_1 \leq N$, and $n_1$ is a positive integer, wherein the $n_1^{th}$ data block is determined based on spectral efficiency of at least one data block in the N data blocks; or the $n_1^{th}$ data block is determined based on an MCS corresponding to at least one data block in the N data blocks; or the $n_1^{th}$ data block is determined based on a priority of at least one data block in the N data blocks and a priority of the UCI; or the $n_1^{th}$ data block is determined based on a quantity of bits corresponding to at least one data block in the N data blocks.

11. The communication apparatus according to claim 10, wherein time-frequency resources occupied by any two data blocks in the N data blocks partially overlap each other or do not overlap each other at all.

12. The communication apparatus according to claim 10, wherein the UCI does not comprise channel state information (CSI).

13. The communication apparatus according to claim 10, wherein a quantity of bits occupied by the UCI is less than A*B, where A≥0, B is a quantity of bits corresponding to $m_1$ data blocks in the N data blocks, $1 \leq m_1 \leq N$, and $m_1$ is a positive integer, wherein the $m_1$ data blocks are determined based on a quantity of bits corresponding to at least one data block in the N data blocks; or the $m_1$ data blocks are determined based on a priority of at least one data block in the N data blocks.

14. The communication apparatus according to claim 10, wherein a priority of the UCI is the same as a priority of the uplink data channel; or a priority of the UCI is the same as a priority of at least one data block in the N data blocks.

15. The communication apparatus according to claim 10, wherein the operations further comprise:

determining a smaller value between a value P and a value Q as a quantity of resource elements that are on the uplink data channel and that are for transmitting the UCI, wherein the value P is a quantity of resource elements occupied by the UCI, and the value Q is an upper limit of the quantity of resource elements that are on the uplink data channel and that are for transmitting the UCI, wherein P and Q are respectively integers greater than or equal to 1.

16. The communication apparatus according to claim 15, wherein the value P is determined based on a quantity of bits corresponding to at least one data block in the N data blocks, or the value P is determined based on a modulation scheme or a code rate corresponding to an $n_2^{th}$ data block in the N data blocks, where $1 \leq n_2 \leq N$, and $n_2$ is a positive integer.

17. The communication apparatus according to claim 10, wherein a quantity of bits occupied by the UCI is less than A*B, where A≥0, B is a quantity of bits corresponding to $m_1$ data blocks in the N data blocks, $1 \leq m_1 \leq N$, and $m_1$ is a positive integer, wherein the $m_1$ data blocks are determined based on a priority of at least one data block in the N data blocks.

18. The communication apparatus according to claim 10, wherein a time-frequency resource occupied by the UCI is comprised in a time-frequency resource corresponding to $m_3$ data blocks in the N data blocks, where $1 \leq m_3 \leq N$, and $m_3$ is a positive integer, wherein the $m_3$ data blocks are determined based on a priority of at least one data block in the N data blocks; or the $m_3$ data blocks are determined based on a priority of at least one data block in the N data blocks and a priority of the UCI; or the $m_3$ data blocks are determined based on a reliability-related parameter corresponding to at least one data block in the N data blocks; or the $m_3$ data blocks are determined based on an MCS corresponding to at least one data block in the N data blocks; or the $m_3$ data blocks are determined based on a latency-related parameter corresponding to at least one data block in the N data blocks.

19. A communication apparatus, comprising:

at least one memory; and at least one processor configured to execute program instructions stored in the at least one memory to enable the apparatus to perform operations comprising:

receiving an uplink data channel from a terminal device, wherein the uplink data channel carries N data blocks, the N data blocks comprise a first data block and a second data block, N is a positive integer greater than or equal to 2, the first data block is modulated based on a first modulation and coding scheme (MCS), and the second data block is modulated based on a second MCS; and obtaining uplink control information (UCI) from the uplink data channel, wherein the operations further comprise:

determining, based on a reliability-related parameter corresponding to or a priority of an $n_3^{th}$ data block, a first parameter corresponding to the $n_3^{th}$ data block, wherein the first parameter is for determining a value Q to be less than a sum of quantities of resource elements occupied by the N data blocks, the value Q is an upper limit of a quantity of resource elements that are on the uplink data channel and that are for transmitting the UCI, and Q is an integer greater than or equal to 1.

20. The communication apparatus according to claim 19, wherein the operations further comprise:

sending indication information to the terminal device, wherein the indication information indicates $m_3$ data blocks in the N data blocks, $1 \leq m_3 \leq N$, $m_3$ is a positive integer, and a time-frequency resource occupied by the UCI is comprised in a time-frequency resource corresponding to the $m_3$ data blocks.

* * * * *